US012707435B2

(12) United States Patent
Liu et al.

(10) Patent No.: US 12,707,435 B2
(45) Date of Patent: Aug. 11, 2026

(54) RESOURCE DETERMINING METHOD AND COMMUNICATIONS DEVICE

(71) Applicant: VIVO MOBILE COMMUNICATION CO., LTD., Chang'an Dongguan (CN)

(72) Inventors: Siqi Liu, Chang'an Dongguan (CN); Zichao Ji, Chang'an Dongguan (CN)

(73) Assignee: VIVO MOBILE COMMUNICATION CO., LTD.

( * ) Notice: Subject to any disclaimer, the term of this patent is extended or adjusted under 35 U.S.C. 154(b) by 346 days.

(21) Appl. No.: 17/863,334

(22) Filed: Jul. 12, 2022

(65) Prior Publication Data

US 2022/0346066 A1 Oct. 27, 2022

Related U.S. Application Data

(63) Continuation of application No. PCT/CN2021/070548, filed on Jan. 7, 2021.

(30) Foreign Application Priority Data

Jan. 14, 2020 (CN) ......................... 202010038446.9

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04L 27/26025* (2021.01); *H04W 72/0446* (2013.01); *H04W 72/23* (2023.01)

(58) Field of Classification Search
CPC . H04W 72/02; H04W 72/0446; H04W 72/23; H04L 1/1812; H04L 27/26025
See application file for complete search history.

(56) References Cited

U.S. PATENT DOCUMENTS

2020/0008266 A1 1/2020 Pan et al.
2020/0092692 A1 3/2020 Wang et al.
(Continued)

FOREIGN PATENT DOCUMENTS

CN 108923894 A 11/2018
CN 110311762 A 10/2019
(Continued)

OTHER PUBLICATIONS

Huawei et al., "Sidelink physical layer structure for NR V2X," 3GPP TSG RAN WG1 Meeting #98, R1-1908039, pp. 1-32, (Aug. 26-30, 2019).

(Continued)

*Primary Examiner* — Justin T Van Roie
(74) *Attorney, Agent, or Firm* — BROOKS KUSHMAN P.C.

(57) ABSTRACT

A resource determining method and a communications device are provided. The method includes: determining a time domain resource of a target uplink channel based on a time interval $y_2$ and a first time domain location of a physical sidelink feedback channel PSFCH, or based on the time interval $y_2$ and a second time domain location of the PSFCH, where the time interval $y_2$ is a time interval between the PSFCH and the target uplink channel.

18 Claims, 10 Drawing Sheets

(51) Int. Cl.

| | |
|---|---|
| ***H04L 27/26*** | (2006.01) |
| ***H04W 72/0446*** | (2023.01) |
| ***H04W 72/23*** | (2023.01) |

(56) References Cited

U.S. PATENT DOCUMENTS

| | | | |
|---|---|---|---|
| 2021/0029675 | A1 | 1/2021 | Ji |
| 2021/0176747 | A1 | 6/2021 | Yang et al. |
| 2022/0140958 | A1 | 5/2022 | Zhou et al. |

FOREIGN PATENT DOCUMENTS

| | | | |
|---|---|---|---|
| CN | 110381599 | A | 10/2019 |
| CN | 110392431 | A | 10/2019 |
| EP | 4 090 089 | A1 | 11/2022 |
| WO | WO-2021057838 | A1 * | 4/2021 |

OTHER PUBLICATIONS

LG Electronics., "Discussion on NR sidelink resource allocation for Mode 1," 3GPP TSG RAN WG1 #99 Meeting, R1-1912587, pp. 1-18, (Nov. 18-22, 2019).

NTT Docomo, Inc., "Sidelink resource allocation mechanism mode 1 for NR V2X," 3GPP TSG RAN WG1 #99, R1-1912881, pp. 1-16, (Nov. 18-22, 2019).

Extended European Search Report dated Apr. 24, 2023 as received in Application No. 21741571.0.

Spreadtrum Communications., "Discussion on NR sidelink Mode 2 resource allocation," 3GPP TSG RAN WG1 #98bis, R1-1910007, pp. 1-5, (Oct. 2019).

Samsung., "On Resource Allocation for NR V2X Mode 1," 3GPP TSG RAN WG1 #99, R1-1912459, pp. 1-10, Nov. 18, 2019.

Vivo., "Discussion on mode 1 resource allocation mechanism," 3GPP TSG RAN WG1 Meeting #99, R1-1912021, pp. 1-18, Nov. 18, 2019.

International Search Report and Written Opinion of the International Searching Authority dated Mar. 30, 2021 as received in Application No. PCT/CN2021/070548.

CN Office Action dated Nov. 29, 2021 as received in Application No. 202010038446.9.

Second Office Action for Japanese Application No. 2022-543157, dated Jan. 10, 2024, 4 Pages.

CMCC "Discussion on mode-1 resource allocation for NR sidelink" 3GPP TSG RAN WGI #99, Reno, USA, Nov. 2019, RI-1912534, 10 Pages.

First Office Action for Korean Application No. 10-2022-7027551, dated Nov. 27, 2024, 11 Pages.

Huawei, HiSilicon "Sidelink resource allocation mode 1" 3GPP TSG RAN WG1 Meeting #99, Reno, USA, Nov. 2019, R1-1911883, 24 Pages.

* cited by examiner 500
511
501
Radio frequency unit
Network module
502
Power supply
Audio output unit
503
510
509
Memory
Application program
Operating system
Processor
504
Input unit
Graphics processing unit
5041
Microphone
5042
508
Interface unit
Sensor
505
User input unit
5071
Touch panel
507
Other input devices
Display unit
Display panel
506
5072
5061

RESOURCE DETERMINING METHOD AND COMMUNICATIONS DEVICE

CROSS-REFERENCE TO RELATED APPLICATIONS

This application is continuation application of PCT International Application No. PCT/CN2021/070548 filed on Jan. 7, 2021, claims priority to Chinese Patent Application No. 202010038446.9, filed in China on Jan. 14, 2020, which is incorporated herein by reference in its entirety.

TECHNICAL FIELD

The present invention relates to the field of communications technologies, and in particular, to a resource determining method and a communications device.

BACKGROUND

A sidelink (through-link or side link) terminal may communicate with another terminal in a sidelink. These terminals are usually vehicles, roadside units (RSU), mobile phones, and the like that support a sidelink technology.

A user performs sidelink transmission (sending or receiving) based on timing of a selected synchronization source, which is also referred to as a synchronization reference or a timing reference. The synchronization source of the user may be timing generated by a base station, a global navigation satellite system (GNSS), or a local clock of the user, or timing provided by another device. A sidelink resource may be numbered based on sidelink timing. In this case, a sidelink frame number is referred to as a direct frame number (DFN). The following scenarios may exist:

In a scenario, a control node on a carrier 1 schedules a user to perform sidelink transmission on a carrier 2, and the user uses timing of the control node on the carrier 2 as sidelink timing of the sidelink transmission of the user.

In another scenario, a control node that operates on a carrier 1 schedules a user to perform sidelink transmission on a carrier 2, and the user uses other timing, for example, timing of the GNSS, as sidelink timing of the sidelink transmission of the user on the carrier 2. In this case, Uu timing and the sidelink timing may not be aligned.

In addition, sidelink and Uu subcarrier spacings (SCS) may also be different, and therefore timing precision is also different.

To improve reliability and resource utilization of data transmission in a sidelink, a hybrid automatic repeat request (HARQ) feedback mechanism is also introduced into the sidelink technology. After receiving sidelink data (the sidelink data is transmitted on a physical sidelink shared channel PSSCH, where the PSSCH is scheduled by sidelink control information SCI, and the SCI is transmitted on a physical sidelink control channel PSCCH and/or the PSSCH), a sidelink receiving user may indicate, by feeding back sidelink HARQ-ACK information, whether sidelink transmission succeeds or fails. The sidelink HARQ-ACK is transmitted on a physical sidelink feedback channel (PSFCH) resource.

A sidelink data packet may be transmitted between a control node and a terminal (in this case, the control node operates in a sidelink), or may be transmitted in a sidelink between terminals. In the latter case, the control node may not directly know whether the transmission of the sidelink data packet succeeds, and the user needs to transmit sidelink HARQ ACK information (for example, a sidelink ACK or NACK) to the control node, so that the control node can further determine whether the transmission in the sidelink succeeds. A terminal that transmits sidelink HARQ-ACK information corresponding to specific sidelink transmission to the control node is a sending terminal of the sidelink transmission. To ensure the sending of the sidelink HARQ-ACK information, the control node needs to allocate a physical uplink control channel (PUCCH) or physical uplink shared channel (PUSCH) resource to the terminal.

However, sidelink timing and Uu timing may be different, and/or timing precision is different. Therefore, a location, understood by the user, of a sidelink transmission resource or a PSFCH, PUCCH, or PUSCH resource may be different from a location, understood by the control node, of the sidelink transmission resource or the PSFCH, PUCCH, or PUSCH resource, or there may be ambiguity.

SUMMARY

Embodiments of the present invention are implemented as follows: A resource determining method includes:

determining a time domain resource of a target uplink channel based on a time interval $y_2$ and a first time domain location $T_{PSFCH\_SL}$ of a physical sidelink feedback channel PSFCH, or based on the time interval $y_2$ and a second time domain location $T_{PSFCH\_Uu}$ of the PSFCH, where the time interval $y_2$ is a time interval between the PSFCH and the target uplink channel, and the time domain resource of the target uplink channel meets any one of the following conditions:

being the $A^{th}$ time domain resource within a time range of $T_{PSFCH\_SL}+y_2$;

being the $A^{th}$ time domain resource within a time range of $T_{PSFCH\_Uu}+y_2$;

being the $A^{th}$ time domain resource that overlaps with $T_{PSFCH\_SL}+y_2$;

being the $A^{th}$ time domain resource that overlaps with $T_{PSFCH\_Uu}+y_2$;

being the $A^{th}$ time domain resource not earlier than $T_{PSFCH\_SL}+y_2$; and being the $A^{th}$ time domain resource not earlier than $T_{PSFCH\_Uu}+y_2$, where A is an integer greater than or equal to 1.

An embodiment of the present invention further provides a resource determining method, including:

obtaining at least one of sidelink timing, Uu timing, and a timing offset, where the timing offset is a time offset between the sidelink timing and the Uu timing; and determining a configured sidelink grant resource and/or a hybrid automatic repeat request HARQ process of the configured sidelink grant resource based on at least one of the sidelink timing, the Uu timing, and the timing offset.

An embodiment of the present invention further provides a communications device, including:

a first determining module, configured to determine a time domain resource of a target uplink channel based on a time interval $y_2$ and a first time domain location $T_{PSFCH\_SL}$ of a physical sidelink feedback channel PSFCH, or based on the time interval $y_2$ and a second time domain location $T_{PSFCH\_Uu}$ of the PSFCH, where the time interval $y_2$ is a time interval between the PSFCH and the target uplink channel, and the time domain resource of the target uplink channel meets any one of the following conditions:

being the $A^{th}$ time domain resource within a time range of $T_{PSFCH\_SL}+y_2$;

being the $A^{th}$ time domain resource within a time range of $T_{PSFCH\_Uu}+y_2$;

being the $A^{th}$ time domain resource that overlaps with $T_{PSFCH\_SL}+y_2$;

being the $A^{th}$ time domain resource that overlaps with $T_{PSFCH\_Uu}+y_2$;

being the $A^{th}$ time domain resource not earlier than $T_{PSFCH\_SL}+y_2$; and being the $A^{th}$ time domain resource not earlier than $T_{PSFCH\_Uu}+y_2$, where A is an integer greater than or equal to 1.

An embodiment of the present invention further provides a communications device, including:

a second obtaining module, configured to obtain at least one of sidelink timing, Uu timing, and a timing offset, where the timing offset is a time offset between the sidelink timing and the Uu timing; and a second determining module, configured to determine a configured sidelink grant resource and/or a hybrid automatic repeat request HARQ process of the configured sidelink grant resource based on at least one of the sidelink timing, the Uu timing, and the timing offset.

An embodiment of the present invention further provides a communications device, including a processor, a memory, and a computer program stored in the memory and capable of running on the processor, where when the computer program is executed by the processor, the steps of the foregoing resource determining method are implemented.

An embodiment of the present invention further provides a computer-readable storage medium, where the computer-readable storage medium stores a computer program, and when the computer program is executed by a processor, the steps of the foregoing resource determining method are implemented.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
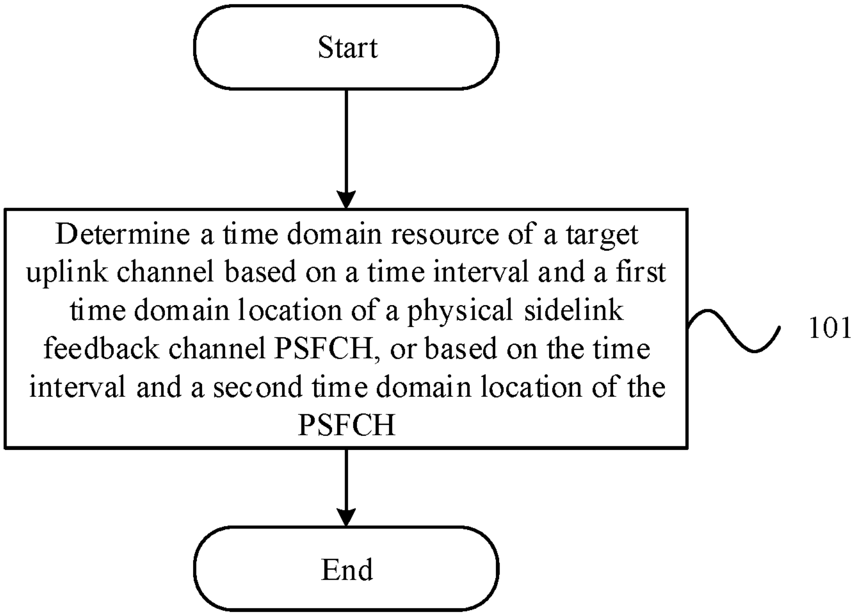
FIG. 1 is a first flowchart of steps of a resource determining method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, the word such as “example” or “for example” is used to represent giving an example, an instance, or an illustration. Any embodiment or design solution described as “an example” or “for example” in the embodiments of the present invention shall not be interpreted to be more preferential or advantageous than other embodiments or design solutions. Specifically, the terms such as “an example” or “for example” are used to present related concepts in a specific manner.

A resource determining method provided in the embodiments of the present invention may be applied to a terminal, and may also be applied to a control node. The terminal may be a mobile phone, a tablet computer, a notebook computer, an ultra-mobile personal computer (UMPC), a netbook, a wearable device, an in-vehicle device, a personal digital assistant (PDA), or the like. It should be noted that a specific type of the terminal is not limited in the embodiments of the present invention. The control node is a base station or some integrated access backhaul (IAB) nodes. In a sidelink, the control node may be a terminal, a roadside unit (RSU), or a base station, or may be some other network facilities similar to the RSU or the IAB nodes. Therefore, some control nodes may have both a sidelink and a Uu link. The base station may be a commonly used base station or an evolved NodeB (eNB), or may be a network-side device (for example, a next generation NodeB (gNB) or a transmission and reception point (TRP)), a cell, or other devices in a 5G system.

It should be noted that meanings of Uu transmission, a Uu SCS, a Uu link, and a Uu resource described in the embodiments of the present invention are uplink transmission and/or downlink transmission between the terminal and the base station, an uplink SCS and/or a downlink SCS between the terminal and the base station, uplink and/or downlink between the terminal and the base station, an uplink resource and/or a downlink resource between the terminal and the base station, and the like.

Scheduling of the terminal by the control node includes inter-RAT sidelink scheduling and intra-RAT sidelink scheduling.

For example, when the control node is an LTE base station, the control node may schedule an NR sidelink (this case is referred to as the inter-RAT sidelink scheduling) or an LTE sidelink (this case is referred to as the intra-RAT sidelink scheduling). When the control node is a base station of 5G or a later version, the control node may schedule an NR sidelink (this case is referred to as the intra-RAT sidelink scheduling) or an LTE sidelink (this case is referred to as the inter-RAT sidelink scheduling).

As shown in FIG. 1, an embodiment of the present invention provides a resource determining method, including the following steps.

Step 101: Determine a time domain resource of a target uplink channel based on a time interval $y_2$ and a first time domain location $T_{PSFCH\_SL}$ of a physical sidelink feedback channel PSFCH, or based on the time interval $y_2$ and a second time domain location $T_{PSFCH\_Uu}$ of the PSFCH, where the time interval $y_2$ is a time interval between the PSFCH and the target uplink channel, and the time domain resource of the target uplink channel meets any one of the following conditions:

being the Ath time domain resource within a time range of $T_{PSFCH\_SL}+y_2$;

being the Ath time domain resource within a time range of $T_{PSFCH\_Uu}+y_2$;

being the Ath time domain resource that overlaps with $T_{PSFCH\_SL}+y_2$;

being the Ath time domain resource that overlaps with $T_{PSFCH\_Uu}+y_2$;

being the Ath time domain resource not earlier than $T_{PSFCH\_SL}+y_2$, or referred to as the Ath time domain resource not earlier than a time domain resource corresponding to $T_{PSFCH\_SL}+y_2$; and being the Ath time domain resource not earlier than $T_{PSFCH\_Uu}+y_2$, or referred to as the Ath time domain resource not earlier than a time domain resource corresponding to $T_{PSFCH\_Uu}+y_2$, where A is an integer greater than or equal to 1.

In this embodiment of the present invention, if the time domain resource of the target uplink channel is the Ath time domain resource within the time range of $T_{PSFCH\_SL}+y_2$, the Ath time domain resource that overlaps with $T_{PSFCH\_SL}+y_2$, or the Ath time domain resource not earlier than $T_{PSFCH\_SL}+y_2$, a terminal and a control node can achieve a consistent understanding of the time domain resource of the target uplink channel based on sidelink timing; or if the time domain resource of the target uplink channel is the $A^{th}$ time domain resource within the time range of $T_{PSFCH\_Uu}+y_2$, the $A^{th}$ time domain resource that overlaps with $T_{PSFCH\_Uu}+y_2$, or the $A^{th}$ time domain resource not earlier than $T_{PSFCH\_Uu}+y_2$, the terminal and the control node can achieve a consistent understanding of the time domain resource of the target uplink channel based on Uu timing.

In this step, for the terminal and the control node, the time interval $y_2$ may be pre-agreed upon; and for the terminal, the time interval $y_2$ may be alternatively configured by a higher layer, or configured by a base station by using downlink control information DCI. This is not specifically limited herein. The target uplink channel includes a physical uplink control channel PUCCH or a physical uplink shared channel PUSCH.

Optionally, the $A^{th}$ time domain resource may be specifically the $A^{th}$ time domain resource, or the $A^{th}$ available time domain resource. For example, the $1^{st}$ (assuming that A=1) time domain resource within the time range of $T_{PSFCH\_SL}+y_2$ is the $1^{st}$ time domain resource within the time range of $T_{PSFCH\_SL}+y_2$, or the $1^{st}$ available time domain resource within the time range of $T_{PSFCH\_SL}+y_2$ (if the $1^{st}$ time domain resource within the time range of $T_{PSFCH\_SL}+y_2$ is unavailable and the $2^{nd}$ time domain resource is available, the $2^{nd}$ time domain resource within the time range of $T_{PSFCH\_SL}+y_2$ is the $1^{st}$ available time domain resource).

For example, a 15 kHz slot corresponding to $T_{PSFCH\_SL}+y_2$ corresponds to two 30 kHz slots, and the $1^{st}$ (A=1) time domain resource represents the $1^{st}$ 30 kHz slot in the 15 kHz slot corresponding to $T_{PSFCH\_SL}+y_2$.

For example, a 15 kHz slot corresponding to $T_{PSFCH\_SL}+y_2$ corresponds to two 30 kHz slots, the $1^{st}$ slot is used for downlink, the $2^{nd}$ slot is used for uplink, and the $1^{st}$ (A=1) available time domain resource represents the $1^{st}$ 30 kHz UL slot available for uplink in the 15 kHz slot corresponding to $T_{PSFCH\_SL}+y_2$.

It should be noted that the terminal and the control node may separately determine $T_{PSFCH\_Uu}$ based on at least one of downlink control information DCI, a PSCCH configuration, a PSSCH configuration, and a PSFCH configuration. Optionally, $T_{PSFCH\_SL}$ is a receiving or sending time of the PSFCH, for example, a start point of a sidelink slot for receiving or sending the PSFCH.

In an implementation, the time domain resource may be a slot, for example, the $A^{th}$ slot not earlier than $T_{PSFCH\_Uu}+y_2$ the $A^{th}$ slot not earlier than a sidelink slot corresponding to $T_{PSFCH\_Uu}+y_2$, or the $A^{th}$ slot not earlier than a Uu slot corresponding to $T_{PSFCH\_Uu}+y_2$.

Optionally, the "not earlier than" means that a start point of the time domain resource is not earlier than, for example, a start point of the slot is not earlier than.

Optionally, the target uplink channel is used to transmit sidelink hybrid automatic repeat request acknowledgement HARQ-ACK information.

For example, a resource of a target uplink channel may be associated with one or more PSFCHs (physical sidelink feedback channels). The terminal obtains sidelink HARQ-ACK information from a PSFCH associated with the terminal, and transmits the sidelink HARQ-ACK information to the control node on the target uplink channel after specific processing.

HARQ-ACK information or other feedback information of a Uu link may also be multiplexed onto the target uplink channel. This is not specifically limited herein.

Optionally, the first time domain location of the PSFCH is a time domain location of the PSFCH that is determined based on sidelink timing, and the second time domain location of the PSFCH is a time domain location of the PSFCH that is determined based on Uu timing.

It should be noted that a time offset between the sidelink timing and the Uu timing may or may not be 0. A sidelink subcarrier spacing (SCS) and a Uu subcarrier spacing may or may not be the same. Therefore, timing precision may or may not be the same.

In an optional embodiment, in a case that there is a timing offset between the sidelink timing and the Uu timing, the method further includes:

determining the first time domain location $T_{PSFCH\_SL}$ of the PSFCH based on at least one of a time domain location $T_{DCI\_Uu}$ of downlink control information DCI, a time interval $y_1$ between the DCI and a sidelink resource indicated by the DCI, a time interval gap, and a timing offset between sidelink timing and Uu timing, where the time interval gap is a time interval between a sidelink resource and a PSFCH corresponding to the sidelink resource, or the time interval gap is a time interval between a sidelink resource and the PSFCH corresponding to the target uplink channel, for example, $T_{PSFCH\_SL}=T_{DCI\_Uu}'+y_2+gap+offset$, where $T_{DCI\_Uu}'$ is equal to $T_{DCI\_Uu}$ or a start point or an end point of a time domain resource in which $T_{DCI\_Uu}$ is located.

In other words, the first time domain location $T_{PSFCH\_SL}$ is related to at least one of the time domain location $T_{DCI\_Uu}$ of the downlink control information DCI, the time interval $y_1$ between the DCI and the sidelink resource indicated by the DCI, the time interval gap, and the timing offset between the sidelink timing and the Uu timing.

Alternatively, in a case that there is a timing offset between the sidelink timing and the Uu timing, the method further includes: determining the first time domain location $T_{PSFCH\_SL}$ of the PSFCH based on the second time domain location $T_{PSFCH\_Uu}$ of the PSFCH and the timing offset between the sidelink timing and the Uu timing, for example, $T_{PSFCH\_SL}=T_{PSFCH\_Uu}+\text{offset}$.

In other words, the first time domain location $T_{PSFCH\_SL}$ is related to the second time domain location $T_{PSFCH\_Uu}$ of the PSFCH and the timing offset between the sidelink timing and the Uu timing.

A value of the timing offset may be an integer or a non-integer. In a case that the value of the timing offset is a non-integer, a value of the offset in the foregoing formula is a value obtained by rounding up the timing offset, for example, offset=ceil(timing offset). Another value is a value obtained by rounding down the timing offset, for example, offset=floor(timing offset). Specifically, in an implementation, $T_{DCI\_Uu}$ is obtained by subtracting ½ TA (the TA is a related value of a time advance, for example, a timing advance) from a time when the terminal receives the DCI.

In an implementation, $y_1$ is a time interval between the DCI and the 1st sidelink resource indicated by the DCI. In another implementation, gap is a time interval between the 1st sidelink resource and a PSFCH corresponding to the 1st sidelink resource. In another implementation, gap is a time interval between the 1st sidelink resource and the PSFCH corresponding to the target uplink channel. Further, optionally, gap may be a time interval between the 1st sidelink resource and a PSFCH corresponding to the last sidelink resource.

Specifically, it is assumed that one piece of DCI schedules B sidelink resources or one configured sidelink grant resource includes B sidelink resources, each sidelink resource corresponds to one PSFCH occasion, PSFCH occasions corresponding to different sidelink resources may be the same PSFCH occasion or may be different PSFCH occasions, and these occasions may correspond to one target uplink channel. In an implementation, gap is a time interval between the 1st sidelink resource and a PSFCH occasion corresponding to the Bth sidelink resource.

It should be noted that a start time of the 1st sidelink transmission is not earlier than the 1st sidelink time domain resource (for example, sidelink slot) of $T_{DCI\_Uu}+y_1$.

In an optional embodiment, in a case that there is no timing offset between the sidelink timing and the Uu timing (in other words, the timing offset is 0, or the sidelink timing and the Uu timing are aligned), the method further includes:

determining the first time domain location $T_{PSFCH\_SL}$ of the PSFCH based on at least one of a time domain location $T_{DCI\_Uu}$ of downlink control information DCI, a time interval $y_1$ between the DCI and a sidelink resource indicated by the DCI, and a time interval gap, where the time interval gap is a time interval between a sidelink resource and a PSFCH corresponding to the sidelink resource, or the time interval gap is a time interval between a sidelink resource and the PSFCH corresponding to the target uplink channel, for example, $T_{PSFCH\_SL}=T_{DCI\_Uu}'+y_1+\text{gap}$, where $T_{DCI\_Uu}'$ is equal to $T_{DCI\_Uu}$ or a start point or an end point of a time domain resource in which $T_{DCI\_Uu}$ is located.

In other words, the first time domain location $T_{PSFCH\_SL}$ is related to at least one of the time domain location $T_{DCI\_Uu}$ of the downlink control information DCI, the time interval $y_1$ between the DCI and the sidelink resource indicated by the DCI, and the time interval gap.

Alternatively, in a case that there is no timing offset between the sidelink timing and the Uu timing (in other words, the timing offset is 0, or the sidelink timing and the Uu timing are aligned), the method further includes:

determining the first time domain location $T_{PSFCH\_SL}$ of the PSFCH based on the second time domain location $T_{PSFCH\_Uu}$ of the PSFCH, for example, $T_{PSFCH\_SL}=T_{PSFCH\_Uu}$.

In other words, the first time domain location $T_{PSFCH\_SL}$ is related to the second time domain location $T_{PSFCH\_Uu}$ of the PSFCH.

Specifically, in an implementation, $T_{DCI\_Uu}$ is obtained by subtracting ½ TA (the TA is a related value of a time advance, for example, a timing advance (Timing Advance)) from a time when the terminal receives the DCI. In an implementation, a start time of the 1st sidelink transmission is not earlier than the 1st sidelink time domain resource (for example, sidelink slot) of $T_{DCI\_Uu}+y_1$.

It should be noted that, in terms of the start point or the end point of the time domain resource in which $T_{DCI\_Uu}$ is located, a possibility of the time domain resource is a Uu slot or a sidelink slot. Optionally, the time domain resource is a sidelink slot.

Optionally, $y_1$ is a time interval between the DCI and the 1st PSSCH and PSCCH resources indicated by the DCI, or $y_1$ is a time interval between the DCI and the 1st PSSCH resource indicated by the DCI, or $y_1$ is a time interval between the DCI and the 1st PSCCH resource indicated by the DCI.

Specifically, $y_1$ is a time interval between the DCI and the 1st sidelink transmission indicated by the DCI, or gap is a time interval between the 1st sidelink transmission and a PSFCH corresponding to the 1st sidelink transmission. In another implementation, gap is a time interval between the 1st sidelink resource and the PSFCH corresponding to the target uplink channel. Further, optionally, gap may be a time interval between the 1st sidelink resource and a PSFCH corresponding to the last sidelink resource.

Specifically, it is assumed that one piece of DCI schedules B sidelink resources or one configured sidelink grant resource includes B sidelink resources, each sidelink resource corresponds to one PSFCH occasion, PSFCH occasions corresponding to different sidelink resources may be the same PSFCH occasion or may be different PSFCH occasions, and these occasions may correspond to one target uplink channel. In an implementation, gap is a time interval between the 1st sidelink resource and a PSFCH occasion corresponding to the Bth sidelink resource.

In another optional embodiment, the offset is determined based on a sidelink subcarrier spacing, or the offset is determined based on an uplink subcarrier spacing. Preferably, the offset is determined based on the uplink subcarrier spacing.

In still another optional embodiment, $y_2$ is determined based on a sidelink subcarrier spacing, or $y_2$ is determined based on an uplink subcarrier spacing.

In another optional embodiment, the gap is determined based on a sidelink subcarrier spacing, or the gap is determined based on an uplink subcarrier spacing.

Optionally, in some special cases, for example, when N sidelink transmissions all correspond to the same PSFCH time domain resource, or only one PSFCH time domain resource before the target uplink channel can correspond to N sidelink transmissions, and the number of scheduled or configured sidelink transmissions is N, the method further includes:

determining the gap based on the period N of the PSFCH and an interval K between the PSFCH and a corresponding physical sidelink shared channel PSSCH. In other words, in a case that the number of sidelink transmissions scheduled by the control node is the same as the number of slots in the period of the PSFCH, or in a case that the number of configured sidelink transmissions is the same as the number of slots in the period of the PSFCH, gap=$K+N$, where in an implementation, N is the period of the PSFCH, and K is a minimum interval (for example, MinTimeGapPSFCH) between the PSFCH and the corresponding physical sidelink shared channel PSSCH.

It should be noted that, in an implementation, a granularity of K and N is a logical slot (for example, a sidelink slot), and a granularity of $y_2$ is a physical slot. Therefore, an actual distance between K sidelink slots may be greater than duration of K slots, and an actual distance between N sidelink slots may be greater than duration of N slots.

In another optional embodiment, the $A^{th}$ time domain resource includes the $A^{th}$ sidelink time domain resource, or the $A^{th}$ Uu time domain resource.

The $A^{th}$ Uu time domain resource is the $A^{th}$ uplink time domain resource.

Optionally, the uplink time domain resource is a resource that can be used for transmission within an uplink resource.

For example, the $1^{st}$ slot that meets any one of the foregoing conditions is a downlink slot, and cannot be used for PUCCH transmission in this case, and the latest slot that can be used for uplink transmission needs to be further found.

It should be noted that subcarrier spacings of the foregoing parameters such as $T_{PSFCH\_SL}$, $T_{PSFCH\_Uu}$, $y_2$, $T_{DCI\_Uu}'$, $T_{DCI\_Uu}$, $y_1$, gap, offset, N, and K may be the same or different; or the foregoing parameters may be logical time or physical time. Therefore, in a specific calculation process of the formulas described in the foregoing embodiments of the present invention, an SCS may need to be converted, and/or uniform conversion into logical time or physical time may need to be performed. This is not specifically limited herein.

The following describes the resource determining method provided in the embodiments of the present invention with reference to several examples and the accompanying drawings. It should be noted that, in the following examples, for example, DCI or all sidelink resources configured by a higher layer corresponds/correspond to the same PSFCH occasion (occasion, or time domain resource). When different resources correspond to different PSFCH occasions, an implementation method is similar, but gap may need to be recalculated, for example, calculated as a time interval between the 1st sidelink resource and a PSFCH occasion corresponding to a target uplink channel. Optionally, the PSFCH occasion corresponding to the target uplink channel is a PSFCH occasion corresponding to the last sidelink resource.

It should be further noted that a shadow part in FIG. 2 to FIG. 7 indicates a PSFCH.

Example 1: There is a Timing Offset Between Sidelink Timing and Uu Timing

It is assumed that the offset=0.5 sidelink slots=0.5 UL slots, DCI schedules two sidelink transmissions and K=N=2, and an uplink subcarrier spacing (UL SCS)=a sidelink subcarrier spacing (Sidelink SCS)=30 kHz.

Figure 2:
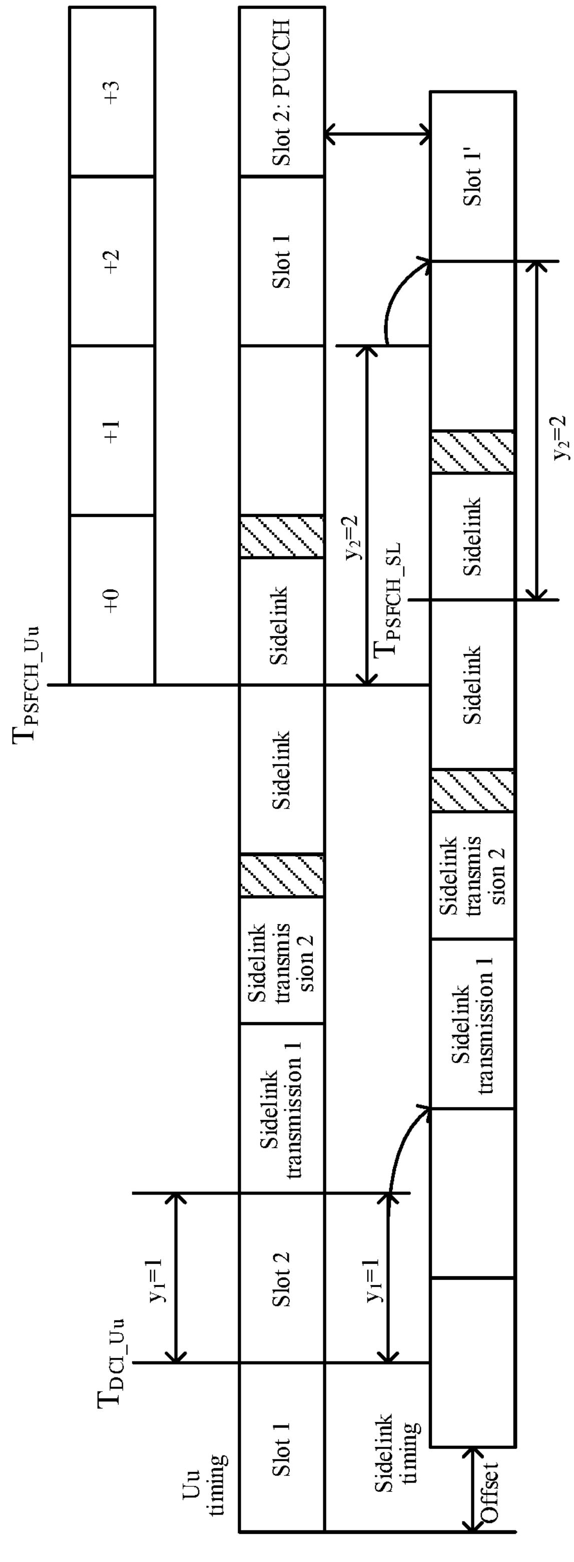
FIG. 2 is a schematic diagram of a principle of Example 1 of a resource determining method according to an embodiment of the present invention.

Based on base station timing, a slot corresponding to y2=2 (a 30 kHz slot) is a slot 1. Based on sidelink timing, a slot corresponding to y2=2 is a slot 1'. As shown in FIG. 2, it can be learned that locations of the slot 1 and the slot 1' are different. A terminal actually considers that PUCCH transmission cannot be earlier than the slot 1'. Because a PUCCH resource is a Uu resource, a PUCCH resource actually used to feed back sidelink HARQ-ACK information should be in one of the following cases:

an available Uu slot or UL slot that overlaps with the slot 1' and is not earlier than the slot 1'; or the latest available Uu slot or UL slot that is not earlier than the slot 1'; or a Uu slot corresponding to $T_{PSFCH\_Uu}$+2+ceil(0.5)=$T_{PSFCH\_Uu}$+3; or the latest available UL slot that is not earlier than a Uu slot corresponding to $T_{PSFCH\_Uu}$+2+ceil(0.5)=$T_{PSFCH\_Uu}$+3.

A PUCCH resource in a slot 2 shown in FIG. 2 is used as an example. In this example, it is assumed that $T_{PSFCH\_Uu}$ is a start point of a slot in which the PSFCH is located. Therefore, $T_{PSFCH\_Uu}$+2 corresponds to the slot 1 in FIG. 2, and $T_{PSFCH\_Uu}$+3 corresponds to the slot 2 in FIG. 2. When $T_{PSFCH\_Uu}$ is defined as an end point of the slot in which the PSFCH is located, the slots corresponding to $T_{PSFCH\_Uu}$+2 and $T_{PSFCH\_Uu}$+3 are correspondingly adjusted, for example, shifted backward.

Example 2: There is a Timing Offset Between Sidelink Timing and Uu Timing

It is assumed that the offset=0.5 sidelink slots=0.25 UL slots, DCI schedules two sidelink transmissions and K=N=2, an uplink subcarrier spacing (UL SCS)=15 kHz, and a sidelink subcarrier spacing (Sidelink SCS)=30 kHz.

Figure 3:
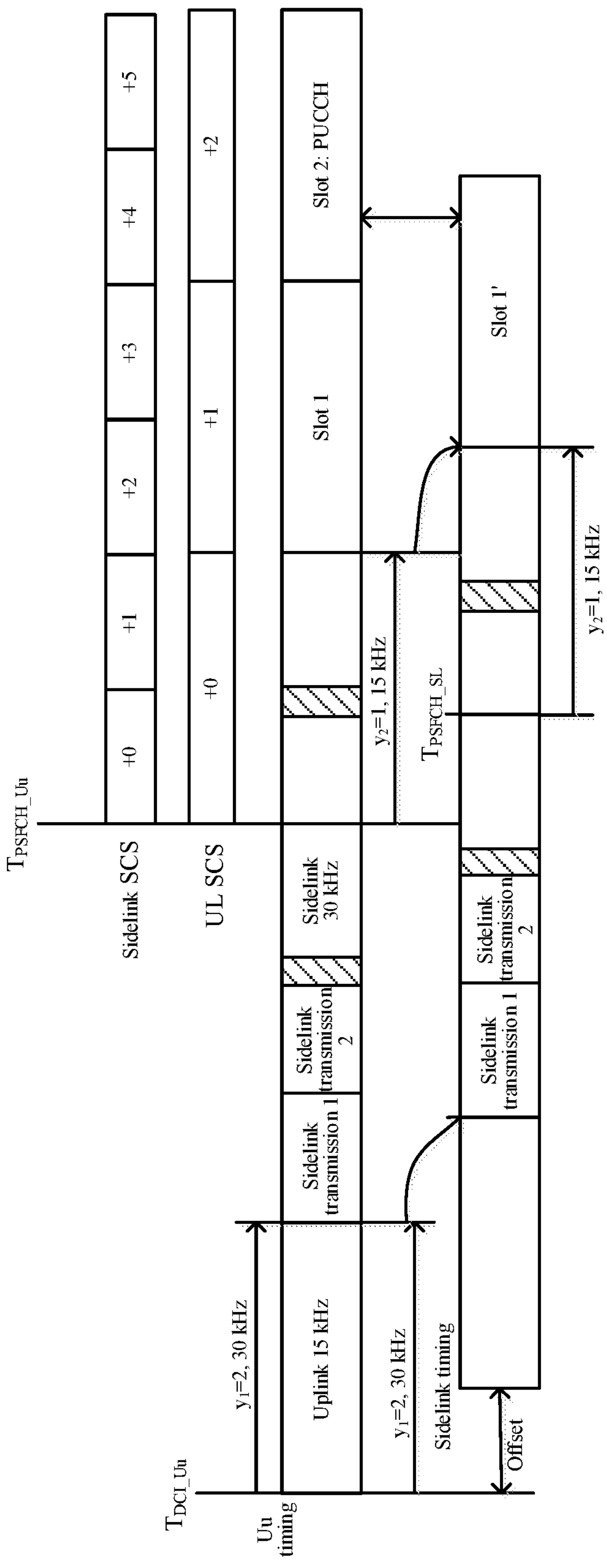
FIG. 3 is a schematic diagram of a principle of Example 2 of a resource determining method according to an embodiment of the present invention.

Based on base station timing, a slot corresponding to y2=1 (a 15 kHz slot) is a slot 1. Based on sidelink timing, a slot corresponding to y2=1 is a slot 1'. As shown in FIG. 3, it can be learned that locations of the slot 1 and the slot 1' are different. Therefore, a PUCCH resource actually used to feed back sidelink HARQ-ACK information should be in one of the following cases:

an available Uu slot or UL slot that overlaps with the slot 1' and is not earlier than the slot 1'; or the latest available Uu slot or UL slot that is not earlier than the slot 1'; or the latest available Uu slot or UL slot that corresponds to a sidelink slot corresponding to $T_{PSFCH\_Uu}$+2+ceil(0.5)= $T_{PSFCH\_Uu}$+3, where 2 and 0.5 herein are the numbers of slots obtained by performing sidelink SCS conversion on $y_2$ and the offset respectively; or a Uu slot or a UL slot that corresponds to $T_{PSFCH\_Uu}$+1+ceil(0.25)=$T_{PSFCH\_Uu}$+2, where 1 and 0.5 herein are the numbers of slots obtained by performing UL SCS conversion on $y_2$ and the offset respectively; or the latest available UL slot that corresponds to a Uu slot corresponding to $T_{PSFCH\_Uu}$+1+ceil(0.25)=$T_{PSFCH\_Uu}$+2, where 1 and 0.25 herein are the numbers of slots obtained by performing UL SCS conversion on $y_2$ and the offset respectively; or a Uu slot or a UL slot that corresponds to $T_{PSFCH\_Uu}$+1+ceil(0.5)=$T_{PSFCH\_Uu}$+1 UL slot duration+1 SL slot duration, where 1 herein is the number of slots obtained by performing UL SCS conversion on $y_2$, and 0.5 is the number of slots obtained by performing sidelink SCS conversion on the offset; or the latest available UL slot that corresponds to a Uu slot corresponding to $T_{PSFCH\_Uu}$+1+ceil(0.5)=$T_{PSFCH\_Uu}$+1 UL slot duration+1 SL slot duration, where 1 herein is the number of slots obtained by performing UL SCS conversion on $y_2$, and 0.5 is the number of slots obtained by performing sidelink SCS conversion on the offset.

A PUCCH resource in a slot 2 shown in FIG. 3 is used as an example. In this example, it is assumed that $T_{PSFCH\_Uu}$ is a start point of a slot in which the PSFCH is located. Therefore, $T_{PSFCH\_Uu}$+1 corresponds to a slot with a UL SCS corresponding to the slot 1 in FIG. 3. When $T_{PSFCH\_Uu}$+1 is defined as an end point of the slot in which the PSFCH is located, the slot corresponding to $T_{PSFCH\_Uu}+y_2$ is correspondingly adjusted, for example, shifted backward.

Example 3: There is a Timing Offset Between Sidelink Timing and Uu Timing

It is assumed that the offset=0.75 sidelink slots=1.5 UL slots, DCI schedules two sidelink transmissions and K=N=2, an uplink subcarrier spacing (UL SCS)=30 kHz, and a sidelink subcarrier spacing (Sidelink SCS)=15 kHz.

Figure 4:
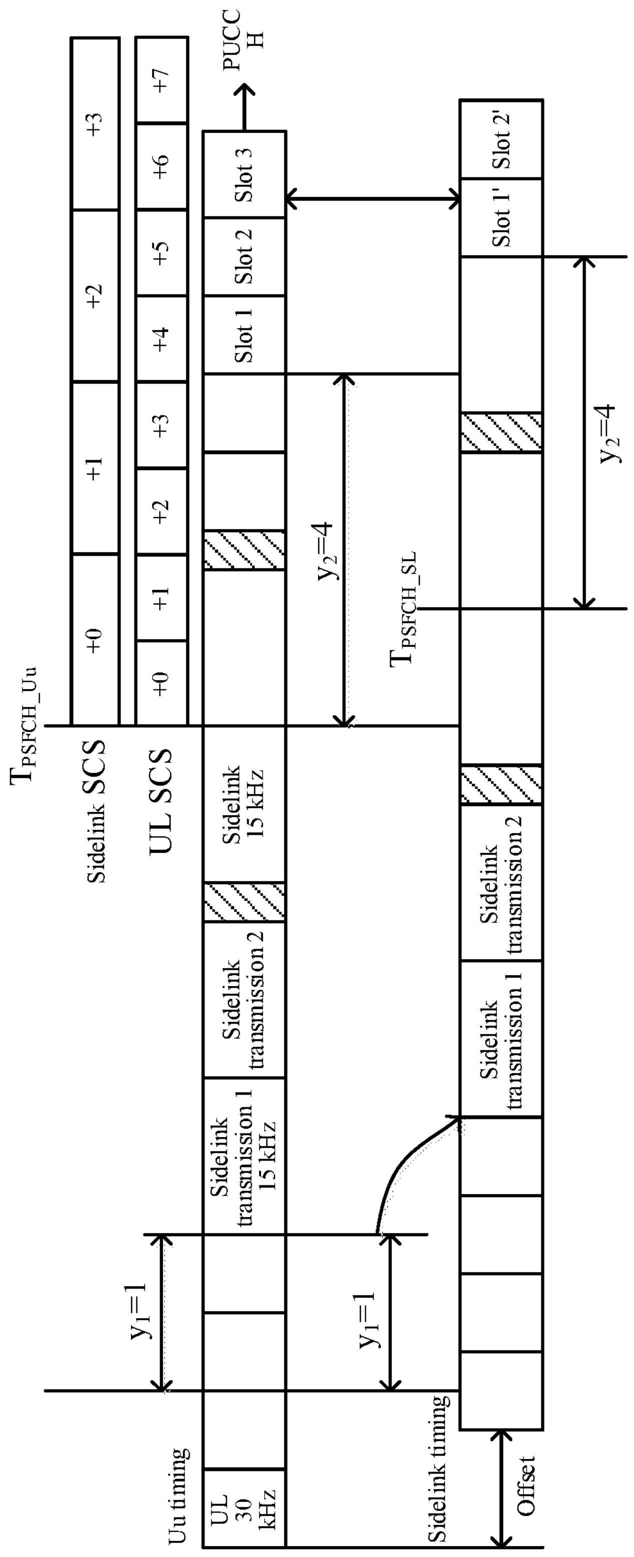
FIG. 4 is a schematic diagram of a principle of Example 3 of a resource determining method according to an embodiment of the present invention.

Based on base station timing, a slot corresponding to y2=4 (30 kHz) is a slot 1. Based on sidelink timing, a slot corresponding to y2=4 is a slot 1'. As shown in FIG. 4, it can be learned that locations of the slot 1 and the slot 1' are different. Therefore, a PUCCH resource actually used to feed back sidelink HARQ-ACK information should be in one of the following cases:

an available Uu slot or UL slot that overlaps with the slot 1' and is not earlier than the slot 1'; or the latest available Uu slot or UL slot that is not earlier than the slot 1'; or the latest available Uu slot or UL slot that corresponds to a slot corresponding to $T_{PSFCH\_Uu}$+2+ceil(0.75)=$T_{PSFCH\_Uu}$+3, where 2 and 0.75 herein are the numbers of slots obtained by performing sidelink SCS conversion on $y_2$ and the offset respectively; or an available Uu slot or UL slot that corresponds to $T_{PSFCH\_Uu}$+4+ceil(1.5)=$T_{PSFCH\_Uu}$+6, where 4 and 1.5 herein are the numbers of slots obtained by performing UL SCS conversion on $y_2$ and the offset respectively; or the latest available UL slot that corresponds to a Uu slot corresponding to $T_{PSFCH\_Uu}$+4+ceil(1.5)=$T_{PSFCH\_Uu}$+6, where 4 and 1.5 herein are the numbers of slots obtained by performing UL SCS conversion on $y_2$ and the offset respectively; or a Uu slot or a UL slot that corresponds to $T_{PSFCH\_Uu}$+2+ceil(0.75)=$T_{PSFCH\_Uu}$+1 UL slot duration+1 SL slot duration, where 2 herein is the number of slots obtained by performing UL SCS conversion on $y_2$, and 0.75 is the number of slots obtained by performing sidelink SCS conversion on the offset; or the latest available UL slot that corresponds to a Uu slot corresponding to $T_{PSFCH\_Uu}$+2+ceil(0.75)=$T_{PSFCH\_Uu}$+1 UL slot duration+1 SL slot duration, where 2 herein is the number of slots obtained by performing UL SCS conversion on $y_2$, and 0.75 is the number of slots obtained by performing sidelink SCS conversion on the offset.

A PUCCH resource in a slot 3 shown in FIG. 4 is used as an example. For another example, as shown in FIG. 4, using a "sidelink SCS" as precision, the slot 3 corresponds to "+3" (A is equal to 1) in FIG. 4; or using a "UL SCS" as precision, the slot 3 corresponds to "+6" (A is equal to 1) and "+7" (A is equal to 2) in FIG. 4. In this case, the PUCCH resource actually used to feed back sidelink HARQ-ACK information is any one of "+3", "+6", and "+7" in FIG. 4.

In other words, a case that A is not equal to 1 may also be referred to as being not earlier than the $2^{nd}$ time domain resource, the $3^{rd}$ time domain resource, or the like within a time domain range of $T_{PSFCH\_Uu}+y_2$ or $T_{PSFCH\_SL}+y_2$. An SCS corresponding to the time domain range of $T_{PSFCH\_Uu}+y_2$ or $T_{PSFCH\_SL}+y_2$ is different from an SCS corresponding to "the $2^{nd}$ time domain resource or the $3^{rd}$ time domain resource".

In this example, it is assumed that $T_{PSFCH\_Uu}$ is a start point of a slot in which the PSFCH is located. Therefore, $T_{PSFCH\_Uu}$+1 corresponds to a slot with a UL SCS corresponding to the slot 1 in FIG. 4. When $T_{PSFCH\_Uu}$+1 is defined as an end point of the slot in which the PSFCH is located, the slot corresponding to $T_{PSFCH\_Uu}+y_2$ is correspondingly adjusted, for example, shifted backward.

Example 4: Sidelink Timing and Uu Timing are Aligned, in Other Words, a Timing Offset=0

Figure 5:
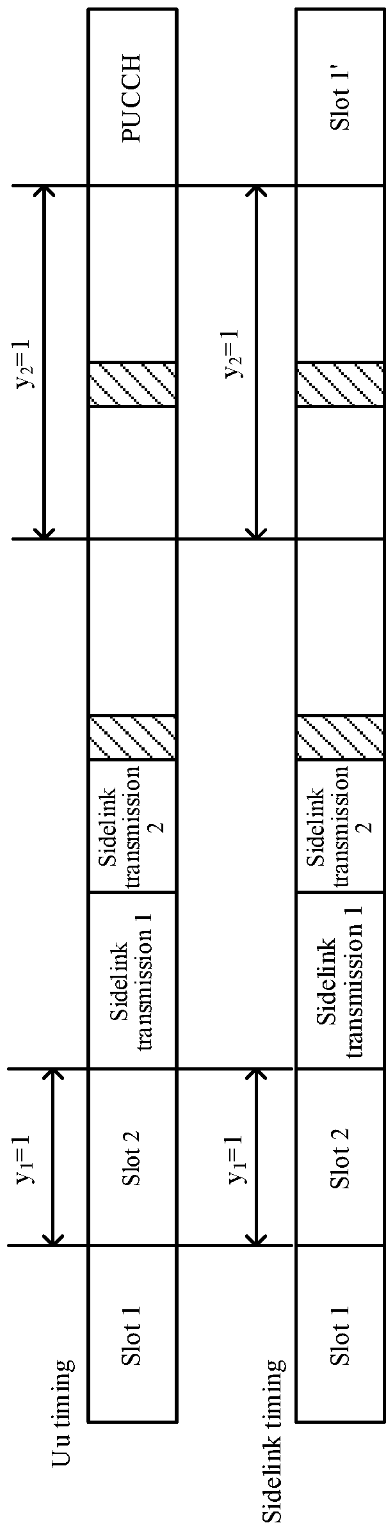
FIG. 5 is a first schematic diagram of a principle of Example 4 of a resource determining method according to an embodiment of the present invention.

It is assumed that DCI schedules two sidelink transmissions and K=N=2, a UL SCS=30 kHz, and an SL SCS=30 kHz. As shown in FIG. 5, $y_1$=1 slot, and $y_2$=1 (30 kHz) slot. In this case, a base station and a control node have a consistent understanding of a PUCCH resource, to be specific, the PUCCH resource is a slot 1'.

Figure 6:
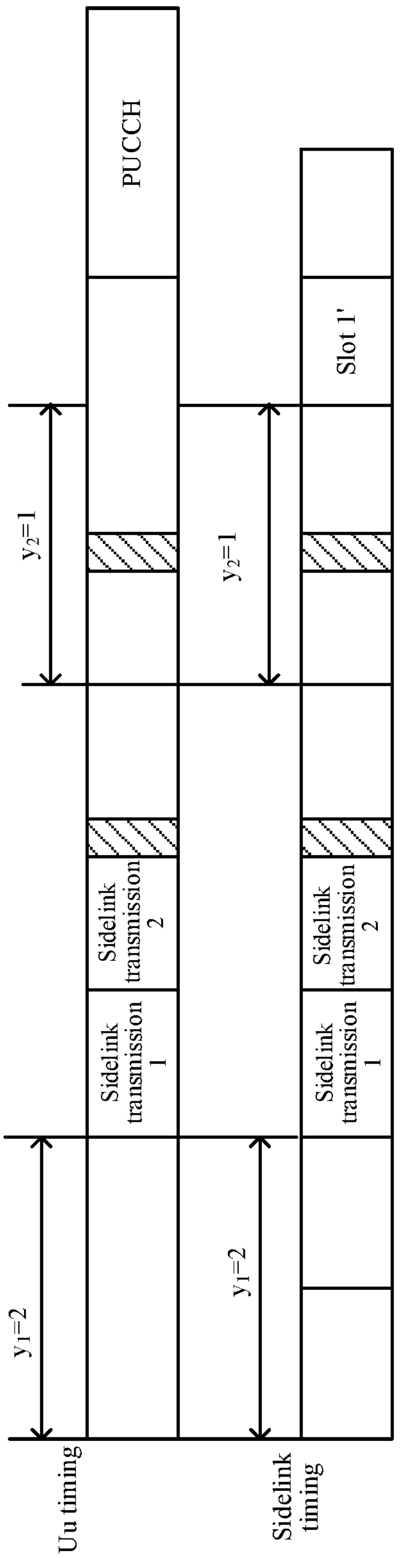
FIG. 6 is a second schematic diagram of a principle of Example 4 of a resource determining method according to an embodiment of the present invention.

It is assumed that DCI schedules two sidelink transmissions and K=N=2, a UL SCS=15 kHz, and an SL SCS=30 kHz. As shown in FIG. 6, $y_1$=2 slots, and $y_2$=1 (15 kHz) slot. In this case, a PUCCH resource is the latest available Uu slot or UL slot that is not earlier than the slot 1'.

Figure 7:
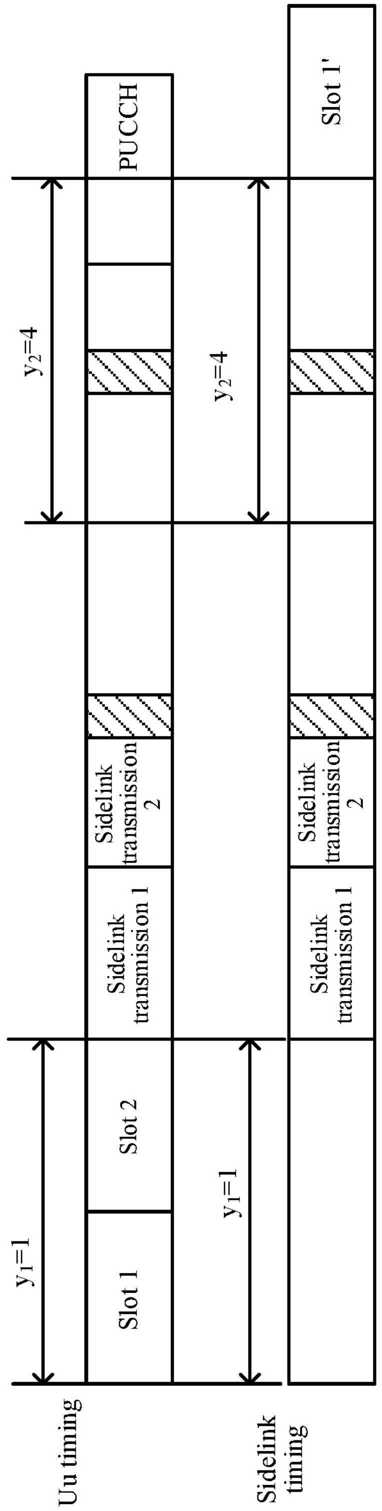
FIG. 7 is a third schematic diagram of a principle of Example 4 of a resource determining method according to an embodiment of the present invention.

It is assumed that DCI schedules two sidelink transmissions and K=N=2, a UL SCS=30 kHz, and an SL SCS=15 kHz. As shown in FIG. 7, $y_1$=1 slot, and $y_2$=4 (30 kHz) slots. In this case, a PUCCH resource is the latest available Uu slot or UL slot that is not earlier than the slot 1'.

To sum up, in this embodiment of the present invention, a terminal and a control node determine the time domain resource of the target uplink channel based on the time interval $y_2$ and the first time domain location of the PSFCH, or the terminal and the control node determine the time domain resource of the target uplink channel based on the time interval $y_2$ and the second time domain location of the PSFCH, and determine the condition met by the time domain resource of the target uplink channel, so that the terminal and the control node can have a consistent understanding of the time domain resource of the target uplink channel, thereby ensuring that the control node properly allocates a resource of the target uplink channel, and improving accuracy of determining a resource of the target uplink channel by the terminal.

Figure 8:
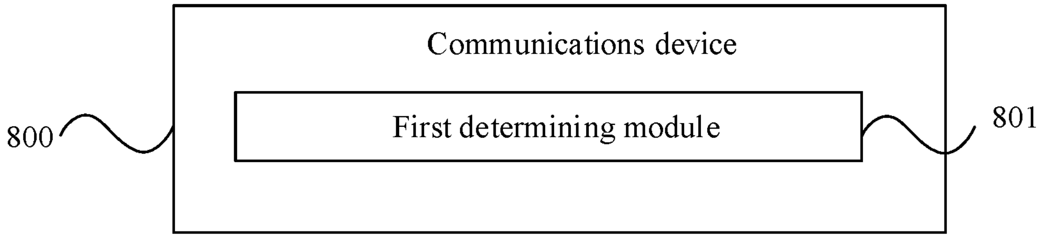
FIG. 8 is a first schematic structural diagram of a communications device according to an embodiment of the present invention.

As shown in FIG. 8, an embodiment of the present invention further provides a communications device 800, including:

a first determining module 801, configured to determine a time domain resource of a target uplink channel based on a time interval $y_2$ and a first time domain location $T_{PSFCH\_Uu}$ of a physical sidelink feedback channel PSFCH, or based on the time interval $y_2$ and a second time domain location $T_{PSFCH\_SL}$ of the PSFCH, where the time interval $y_2$ is a time interval between the PSFCH and the target uplink channel, and the time domain resource of the target uplink channel meets any one of the following conditions:

being the $A^{th}$ time domain resource within a time range of $T_{PSFCH\_SL}+y_2$;

being the $A^{th}$ time domain resource within a time range of $T_{PSFCH\_Uu}+y_2$;

being the $A^{th}$ time domain resource that overlaps with $T_{PSFCH\_SL}+y_2$;

being the $A^{th}$ time domain resource that overlaps with $T_{PSFCH\_Uu}+y_2$;

being the $A^{th}$ time domain resource not earlier than $T_{PSFCH\_SL}+y_2$; and being the $A^{th}$ time domain resource not earlier than $T_{PSFCH\_Uu}+y_2$, where A is an integer greater than or equal to 1.

Optionally, in the foregoing embodiment of the present invention, the target uplink channel is used to transmit sidelink hybrid automatic repeat request acknowledgement HARQ-ACK information.

Optionally, in the foregoing embodiment of the present invention, the first time domain location of the PSFCH is a time domain location of the PSFCH that is determined based on sidelink timing; and the second time domain location of the PSFCH is a time domain location of the PSFCH that is determined based on Uu timing.

Optionally, in the foregoing embodiment of the present invention, the method further includes:

determining the first time domain location $T_{PSFCH\_SL}$ of the PSFCH based on at least one of a time domain location $T_{DCI\_Uu}$ of downlink control information DCI, a time interval $y_1$ between the DCI and a sidelink resource indicated by the DCI, a time interval gap, and a timing offset between sidelink timing and Uu timing, where the time interval gap is a time interval between a sidelink resource and a PSFCH corresponding to the sidelink resource, or the time interval gap is a time interval between a sidelink resource and the PSFCH corresponding to the target uplink channel;

or determining the first time domain location $T_{PSFCH\_SL}$ of the PSFCH based on the second time domain location $T_{PSFCH\_Uu}$ of the PSFCH and the timing offset between the sidelink timing and the Uu timing.

Optionally, in the foregoing embodiment of the present invention, the method further includes:

determining the first time domain location $T_{PSFCH\_SL}$ of the PSFCH based on at least one of a time domain location $T_{DCI\_Uu}$ of downlink control information DCI, a time interval $y_1$ between the DCI and a sidelink resource indicated by the DCI, and a time interval gap, where the time interval gap is a time interval between a sidelink resource and a PSFCH corresponding to the sidelink resource, or the time interval gap is a time interval between a sidelink resource and the PSFCH corresponding to the target uplink channel;

or determining the first time domain location $T_{PSFCH\_SL}$ of the PSFCH based on the second time domain location $T_{PSFCH\_Uu}$ of the PSFCH.

Optionally, in the foregoing embodiment of the present invention, the offset is determined based on a sidelink subcarrier spacing, or the offset is determined based on an uplink subcarrier spacing.

Optionally, in the foregoing embodiment of the present invention, $y_2$ is determined based on a sidelink subcarrier spacing, or $y_2$ is determined based on an uplink subcarrier spacing.

Optionally, in the foregoing embodiment of the present invention, the gap is determined based on a sidelink subcarrier spacing, or the gap is determined based on an uplink subcarrier spacing.

Optionally, in the foregoing embodiment of the present invention, in a case that the number of sidelink resources scheduled by a control node is the same as the number of slots in a period of the PSFCH, the method further includes:

determining the gap based on the period N of the PSFCH and an interval K between the PSFCH and a corresponding physical sidelink shared channel PSSCH.

Optionally, in the foregoing embodiment of the present invention, the $A^{th}$ available time domain resource includes the $A^{th}$ available sidelink time domain resource, or the $A^{th}$ available Uu time domain resource.

The communications device provided in this embodiment of the present invention is capable of implementing processes that are implemented by the communications device in the method embodiments of FIG. 1 to FIG. 7. To avoid repetition, details are not described herein again.

To sum up, in this embodiment of the present invention, a terminal and a control node determine the time domain resource of the target uplink channel based on the time interval $y_2$ and the first time domain location of the PSFCH, or the terminal and the control node determine the time domain resource of the target uplink channel based on the time interval $y_2$ and the second time domain location of the PSFCH, and determine the condition met by the time domain resource of the target uplink channel, so that the terminal and the control node can have a consistent understanding of the time domain resource of the target uplink channel, thereby ensuring that the control node properly allocates a resource of the target uplink channel, and improving accuracy of determining a resource of the target uplink channel by the terminal.

It should be noted that the communications device provided in this embodiment of the present invention is a communications device capable of performing the foregoing resource determining method, and all embodiments of the foregoing resource determining method are applicable to the communications device, with the same or similar beneficial effects achieved.

Preferably, an embodiment of the present invention further provides a communications device, including a processor, a memory, and a computer program stored in the memory and capable of running on the processor. When the computer program is executed by the processor, the processes of the foregoing resource determining method embodiment are implemented, with the same technical effects achieved. To avoid repetition, details are not described herein again.

An embodiment of the present invention further provides a computer-readable storage medium, where the computer-readable storage medium stores a computer program. When the computer program is executed by a processor, the processes of the foregoing resource determining method embodiment are implemented, with the same technical effects achieved. To avoid repetition, details are not described herein again. For example, the computer-readable storage medium is a read-only memory (ROM), a random access memory (RAM), a magnetic disk, an optical disk, or the like.

Figure 9:
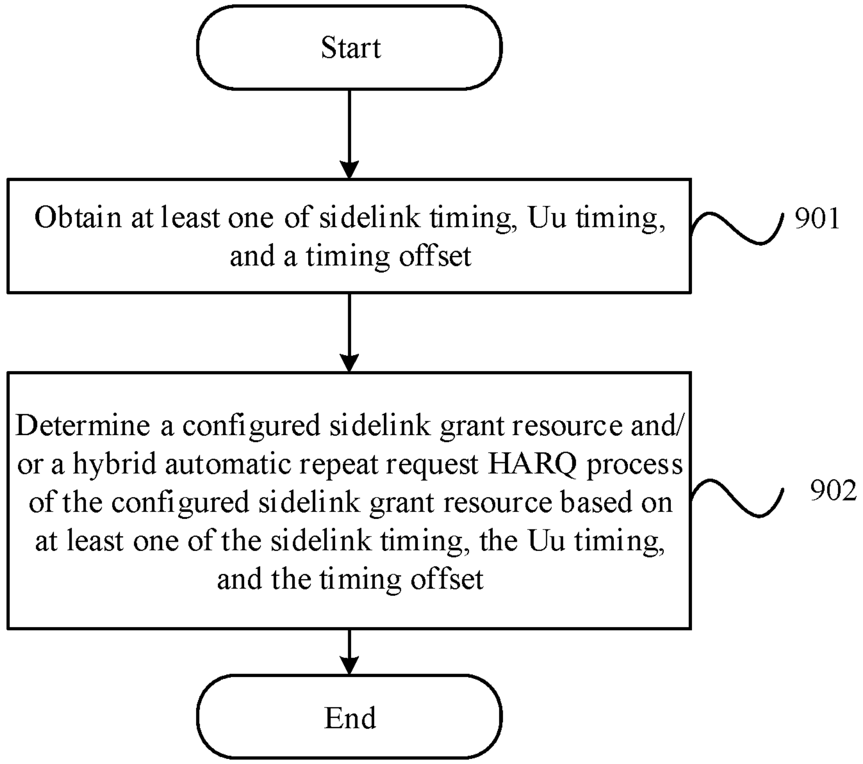
FIG. 9 is a second flowchart of steps of a resource determining method according to an embodiment of the present invention.

As shown in FIG. 9, an embodiment of the present invention further provides a resource determining method, including the following steps.

Step 901: Obtain at least one of sidelink timing, Uu timing, and a timing offset, where the timing offset is a time offset between the sidelink timing and the Uu timing.

Step 902: Determine a configured sidelink grant (sidelink configured grant or configured sidelink grant) resource and/or a hybrid automatic repeat request HARQ process of the configured sidelink grant resource based on at least one of the sidelink timing, the Uu timing, and the timing offset.

The timing offset is an offset between the Uu timing and the sidelink timing, and precision of the offset may be at least one of a microsecond μs, a symbol, a slot, a subframe subframe, a millisecond ms, a frame frame, a second second, and the like. In the formula, the timing offset may need to be converted into a corresponding unit, for example, converted into at least one of the number of μs, the number of symbols, the number of slots, the number of subframes, the number of ms, the number of seconds, and the number of frames. This is not limited.

This embodiment of the present invention provides at least three manners of determining the configured sidelink grant resource and/or the hybrid automatic repeat request HARQ process of the configured sidelink grant resource, including:

Manner 1: Determine the configured sidelink grant resource and/or the hybrid automatic repeat request HARQ process of the configured sidelink grant resource based on the sidelink timing (for example, a direct frame number DFN).

Manner 2: Determine the configured sidelink grant resource and/or the hybrid automatic repeat request HARQ process of the configured sidelink grant resource based on the Uu timing (for example, a system frame number SFN) and the timing offset.

Manner 3: Determine the configured sidelink grant resource and/or the hybrid automatic repeat request HARQ process of the configured sidelink grant resource based on the Uu timing (for example, a system frame number SFN).

In Manner 3, in an implementation, a terminal assumes that $y_4$ is large enough to process steps included in a sidelink transmission, PSFCH sending/receiving, PUCCH, or PUSCH process. In another implementation, the terminal needs to perform transmission in advance by TA/2 or TA when performing transmission on the configured sidelink grant resource. In still another implementation, when performing transmission on the configured sidelink grant resource, the terminal assumes (assume) or expects (expect) that a boundary of a slot in which the configured sidelink grant resource is located is aligned with a slot boundary, a subframe boundary, or a frame boundary that is derived by advancing, by TA/2 or TA, timing of a slot in which the last received downlink control information, synchronization signal block SSB, channel state information-reference signal CSI-RS, or another downlink signal is located. It should be noted that boundary alignment does not mean overlapping.

In an optional embodiment, the method further includes:

determining a period of the configured sidelink grant resource based on at least one of an interval $y_3$ between downlink control information DCI and a sidelink resource indicated by the DCI or an offset value $y_3$ of the configured sidelink grant resource, an interval $y_4$ between a physical sidelink feedback channel PSFCH and a channel used to transmit sidelink HARQ-ACK information, a time domain range $S_1$ occupied by a data resource and/or a control resource of the configured sidelink grant resource, a period N of the PSFCH, and an interval K between the PSFCH and a corresponding physical sidelink shared channel PSSCH. Optionally, K is a minimum interval between the PSFCH and the corresponding PSSCH.

For example, the period of the configured sidelink grant resource meets at least one of the following conditions:

greater than $y_3+S_1+(N+K-1)$;

equal to $y_3+S_1+(N+K-1)$;

greater than $S_1+(N+K-1)+y_4$;

equal to $S_1+(N+K-1)+y_4$;

greater than $y_3+S_1+(N+K-1)+y_4$; and equal to $y_3+S_1+(N+K-1)+y_4$, where $y_3$ is the interval between the downlink control information DCI and the sidelink resource indicated by the DCI or the offset value (for example, timeOffsetCGType1) of the configured sidelink grant resource, where optionally, the value may be 0, and in this case, $y_3$ is absent in the foregoing formula; $y_4$ is the interval between the physical sidelink feedback channel PSFCH and the channel used to transmit the sidelink HARQ-ACK information; $S_1$ is the time domain range occupied by the data resource and/or the control resource of the configured sidelink grant resource; N is the period of the PSFCH; and K is the minimum interval between the PSFCH and the corresponding physical sidelink shared channel PSSCH.

Optionally, $S_1$ may be indicated by DCI, or may be configured by a higher layer. This is not specifically limited herein.

For example, in a period, the data resource and the control resource of the configured sidelink grant resource are separately located in a sidelink slot 1, a sidelink slot 9, and a sidelink slot 10. In this case, S1 corresponds to 10 sidelink slots, or S1 corresponds to physical duration corresponding to the sidelink slot 1 to the sidelink slot 10.

If the period is greater than or equal to $y_3+S_1+(N+K-1)$, it can be ensured that a PSFCH corresponding to the last transmission in each period is within a corresponding period. If the period is greater than or equal to $S_1+(N+K-1)+y_4$ or the period is greater than or equal to $y_3+S_1+(N+K-1)+y_4$, it can be ensured that a PUCCH or a PSUCH corresponding to the last transmission in each period is within a corresponding resource.

Optionally, for the configured sidelink grant resource, $y_4$ specifically indicates an interval between the last PSFCH associated with sidelink transmission in each period and a corresponding PUCCH or PUSCH.

For example, a minimum value of the period=3 sidelink slots. In this case, the timing offset=0, a time domain range occupied by a time domain resource indicated by sidelink control information=1 slot, N=1, K=2, and y4=0.

It should be noted that subcarrier spacings SCSs of parameters of $y_3+S_1+(N+K-1)$, $S_1+(N+K-1)+y_4$, and $y_3+S_1+(N+K-1)+y_4$ may be the same or different. In an implementation, K and N are logical slots (for example, sidelink slots), and $y_3$ and $y_4$ are physical slots. Further, precision or SCSs may also be different. Therefore, in the foregoing formula, an SCS may need to be converted, and/or uniform conversion into logical time or physical time may need to be performed. This is not specifically limited herein.

When a period is defined based on physical time, if a configured sidelink grant resource conflicts with a non-sidelink resource, the configured sidelink grant resource in conflict or a configured sidelink grant resource within the period is considered invalid.

Optionally, the determining a HARQ process of the configured sidelink grant resource in step 902 includes:

determining the HARQ process of the configured sidelink grant resource based on a HARQ process start value and/or process offset value;

and/or determining, based on identification information of the configured sidelink grant resource, a HARQ process of a configured sidelink grant resource corresponding to the identification information of the configured sidelink grant resource.

To sum up, in this embodiment of the present invention, a terminal and a control node determine the configured sidelink grant resource and/or the hybrid automatic repeat request HARQ process of the configured sidelink grant resource based on at least one of the sidelink timing, the Uu timing, and the timing offset, so that the terminal and the control node can achieve a consistent understanding of the configured sidelink grant resource, thereby ensuring that the control node properly allocates the configured sidelink grant resource, and improving accuracy of determining the configured sidelink grant resource by the terminal.

To more clearly describe the resource determining method provided in the embodiments of the present invention, the following provides descriptions in detail with reference to two examples.

Example 5: Determine the Configured Sidelink Grant Resource Based on the DFN

It is assumed that one configured sidelink grant resource is associated with nrofHARQ-Processes (the number of HARQ processes) processes. S is a PSSCH transmission occasion in the configured sidelink grant resource, or a number (for example, startSLsymbols) of a start symbol of the PSSCH transmission occasion in a slot.

Optionally, "timeOffsetCGType1" indicates a start slot of a configured grant Type 1 resource relative to DFN0 #, or an offset of the configured grant Type 1 resource relative to DFN0 #, for example, a slot offset.

For a configured grant Type 1, the configured sidelink grant resource is determined based on the following formula. For example, a start symbol meets the following formula:

$$[(\text{DFN}\times\text{numberOfSlotsPerFrame}\times\text{numberOfSymbolsPerSlot})+(\text{slot number in the frame}\times\text{numberOfSymbolsPerSlot})+\text{symbol number in the slot}]=(\text{timeDomainOffset}\times\text{numberOfSymbolsPerSlot}+S+N\times\text{periodicity})\ \text{modulo}\ (1024\times\text{numberOfSlotsPerFrame}\times\text{numberOfSymbolsPerSlot}),\ \text{for all}\ N>=0$$

For a configured grant Type 2, the configured sidelink grant resource is determined based on the following formula. For example, a start symbol meets the following formula:

$$[(\text{DFN}\times\text{numberOfSlotsPerFrame}\times\text{numberOfSymbolsPerSlot})+(\text{slot number in the frame}\times\text{numberOfSymbolsPerSlot})+\text{symbol number in the slot}]=[(\text{DFN}_{start\ time}\times\text{numberOfSlotsPerFrame}\times\text{numberOfSymbolsPerSlot}+\text{slot}_{start\ time}\times\text{numberOfSymbolsPerSlot}+\text{symbol}_{start\ time})+N\times\text{periodicity}]\ \text{modulo}\ (1024\times\text{numberOfSlotsPerFrame}\times\text{numberOfSymbolsPerSlot}),\ \text{for all}\ N>=0,$$

where $\text{DFN}_{start\ time}$, $\text{slot}_{start\ time}$, and $\text{symbol}_{start\ time}$ are a PSCCH transmission occasion or a DFN of a PSSCH transmission occasion, a slot, and a symbol respectively, and optionally, are the 1st PSCCH transmission occasion in a period or a DFN of the 1st PSCCH transmission occasion, a slot, and a symbol respectively; and numberOfSlotsPerFrame is the number of slots included in each frame, numberOfSymbolsPerSlot is the number of symbols included in each slot, slot number in the frame is a number of a slot in a frame, and symbol number in the slot is a number of a symbol in a slot.

Optionally, for a configured sidelink grant resource, an associated HARQ process ID is derived from the following equation:

$$\text{HARQ Process ID}=\text{ID\_offset}+[\text{floor}(\text{CURRENT\_symbol}/\text{periodicity})]\ \text{modulo nrofHARQ-Processes, where}$$

$$\text{CURRENT\_symbol}=(\text{DFN}\times\text{numberOfSlotsPerFrame}\times\text{numberOfSymbolsPerSlot}+\text{slot number in the frame}\times\text{numberOfSymbolsPerSlot}+\text{symbol number in the slot}); \text{and}$$

ID_offset is a HARQ ID offset or a minimum HARQ ID corresponding to the configured sidelink grant resource.

Optionally, there is a correspondence between ID_offset and an ID of the configured sidelink grant resource.

Optionally, ID_offset may be 0.

Optionally, at least one of the DFN and the sidelink slot is a frame or slot number obtained by sorting sidelink resources.

Example 6: Determine the Configured Sidelink Grant Resource Based on the SFN and the Timing Offset It is assumed that one configured sidelink grant resource is associated with nrofHARQ-Processes (the number of HARQ processes) processes. The timing offset is an offset between the Uu timing and the sidelink timing.

S is a PSSCH transmission occasion in the configured sidelink grant resource, or a number (for example, startSLsymbols) of a start symbol of the PSSCH transmission occasion in a slot.

For a configured grant Type 1, the configured sidelink grant resource is determined based on the following formula. For example, a start symbol meets the following formula:

$$[(\text{SFN}\times\text{numberOfSlotsPerFrame}\times\text{numberOfSymbolsPerSlot})+(\text{slot number in the frame}\times\text{numberOfSymbolsPerSlot})+\text{symbol number in the slot}]+\text{Offset}=(\text{timeDomainOffset}\times\text{numberOfSymbolsPerSlot}+S+N\times\text{periodicity})\ \text{modulo}\ (1024\times\text{numberOfSlotsPerFrame}\times\text{numberOfSymbolsPerSlot}),\ \text{for all}\ N>=0$$

For a configured grant Type 2, the configured sidelink grant resource is determined based on the following formula. For example, a start symbol meets the following formula:

$$[(\text{SFN}\times\text{numberOfSlotsPerFrame}\times\text{numberOfSymbolsPerSlot})+(\text{slot number in the frame}\times\text{numberOfSymbolsPerSlot})+\text{symbol number in the slot}]+\text{Offset}=[(\text{SFN}_{start\ time}\times\text{numberOfSlotsPerFrame}\times\text{numberOfSymbolsPerSlot}+\text{slot}_{start\ time}\times\text{numberOfSymbolsPerSlot}+\text{symbol}_{start\ time})+N\times\text{periodicity}]\ \text{modulo}\ (1024\times\text{numberOfSlotsPerFrame}\times\text{numberOfSymbolsPerSlot}),\ \text{for all}\ N>=0,$$

where $\text{SFN}_{start\ time}$, $\text{slot}_{start\ time}$, and $\text{symbol}_{start\ time}$ are a PSCCH transmission occasion or an SFN of a PSSCH transmission occasion, a slot, and a symbol respectively, and optionally, are the 1st PSCCH transmission occasion in a period or an SFN of the 1st PSCCH transmission occasion, a slot, and a symbol respectively; and numberOfSlotsPerFrame is the number of slots included in each frame, numberOfSymbolsPerSlot is the number of symbols included in each slot, slot number in the frame is a number of a slot in a frame, and symbol number in the slot is a number of a symbol in a slot.

Optionally, for a configured sidelink grant resource, an associated HARQ process ID is derived from the following equation:

HARQ Process ID=ID_offset[floor(CURRENT_symbol/periodicity)] modulo nrofHARQ-Processes, where CURRENT_symbol=(SFN×numberOfSlotsPerFrame×numberOfSymbolsPerSlot+slot number in the frame×numberOfSymbolsPerSlot+symbol number in the slot)+offset; and ID_offset is a HARQ ID offset or a minimum HARQ ID corresponding to the CG.

Optionally, there is a correspondence between ID offset and an ID of the configured sidelink grant resource.

Optionally, ID_offset may be 0.

Figure 10:
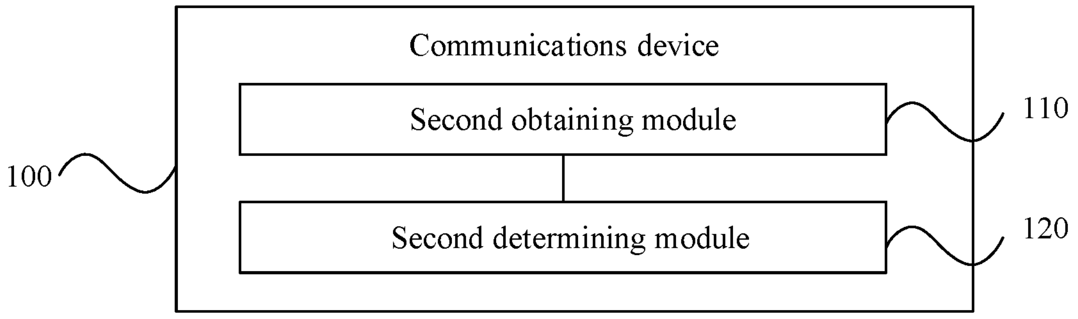
FIG. 10 is a second schematic structural diagram of a communications device according to an embodiment of the present invention.

As shown in FIG. 10, an embodiment of the present invention further provides a communications device 100, including:

- a second obtaining module 110, configured to obtain at least one of sidelink timing, Uu timing, and a timing offset, where the timing offset is a time offset between the sidelink timing and the Uu timing; and
- a second determining module 120, configured to determine a configured sidelink grant resource and/or a hybrid automatic repeat request HARQ process of the configured sidelink grant resource based on at least one of the sidelink timing, the Uu timing, and the timing offset.

Optionally, in the foregoing embodiment of the present invention, the communications device further includes:

- a period determining module, configured to determine a period of the configured sidelink grant resource based on at least one of an interval $y_3$ between downlink control information DCI and a sidelink resource indicated by the DCI or an offset value $y_3$ of the configured sidelink grant resource, an interval $y_4$ between a physical sidelink feedback channel PSFCH and a channel used to transmit sidelink HARQ-ACK information, a time domain range $S_1$ occupied by a data resource and/or a control resource of the configured sidelink grant resource, a period N of the PSFCH, and an interval K between the PSFCH and a corresponding physical sidelink shared channel PSSCH.

Optionally, in the foregoing embodiment of the present invention, the determining a HARQ process of the configured sidelink grant resource includes:

- determining the HARQ process of the configured sidelink grant resource based on a HARQ process start value and/or process offset value;

and/or

- determining, based on identification information of the configured sidelink grant resource, a HARQ process of a configured sidelink grant resource corresponding to the identification information of the configured sidelink grant resource.

To sum up, in this embodiment of the present invention, a terminal and a control node determine the configured sidelink grant resource and/or the hybrid automatic repeat request HARQ process of the configured sidelink grant resource based on at least one of the sidelink timing, the Uu timing, and the timing offset, so that the terminal and the control node can achieve a consistent understanding of the configured sidelink grant resource, thereby ensuring that the control node properly allocates the configured sidelink grant resource, and improving accuracy of determining the configured sidelink grant resource by the terminal.

It should be noted that the communications device provided in this embodiment of the present invention is a communications device capable of performing the foregoing resource determining method, and all embodiments of the foregoing resource determining method are applicable to the communications device, with the same or similar beneficial effects achieved.

Preferably, an embodiment of the present invention further provides a communications device, including a processor, a memory, and a computer program stored in the memory and capable of running on the processor. When the computer program is executed by the processor, the processes of the foregoing resource determining method embodiment are implemented, with the same technical effects achieved. To avoid repetition, details are not described herein again.

An embodiment of the present invention further provides a computer-readable storage medium, where the computer-readable storage medium stores a computer program. When the computer program is executed by a processor, the processes of the foregoing resource determining method embodiment are implemented, with the same technical effects achieved. To avoid repetition, details are not described herein again. For example, the computer-readable storage medium is a read-only memory (ROM), a random access memory (RAM), a magnetic disk, an optical disk, or the like.

Figure 11:
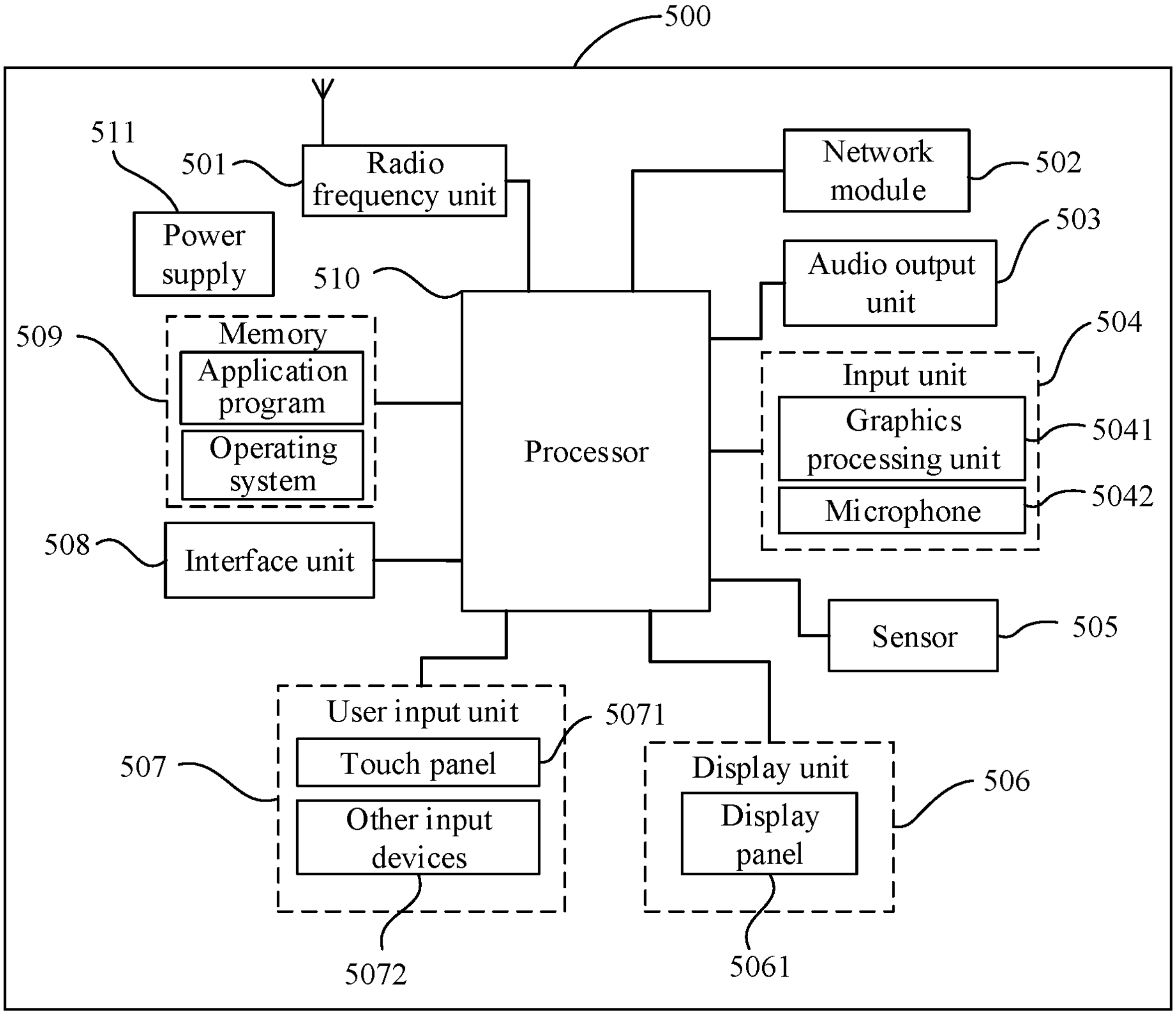
FIG. 11 is a schematic structural diagram of a terminal according to an embodiment of the present invention.

In a case that the resource determining method provided in the embodiments of the present invention is applied to a terminal, FIG. 11 is a schematic diagram of a hardware structure of a terminal for implementing the embodiments of the present invention. The terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art can understand that the terminal structure shown in FIG. 11 does not constitute a limitation on the terminal. The terminal may include more or fewer components than those shown in the figure, or some components may be combined, or there may be a different component layout. In this embodiment of the present invention, the terminal includes but is not limited to a mobile phone, a tablet computer, a notebook computer, a palmtop computer, a vehicle-mounted terminal, a wearable device, a pedometer, or the like.

The processor 510 is configured to determine a time domain resource of a target uplink channel based on a time interval $y_2$ and a first time domain location $T_{PSFCH\_SL}$ of a physical sidelink feedback channel PSFCH, or based on the time interval $y_2$ and a second time domain location $T_{PSFCH\_Uu}$ of the PSFCH, where the time interval $y_2$ is a time interval between the PSFCH and the target uplink channel, and the time domain resource of the target uplink channel meets any one of the following conditions:

- being the Ath time domain resource within a time range of $T_{PSFCH\_SL}+y_2$;
- being the Ath time domain resource within a time range of $T_{PSFCH\_Uu}+y_2$;

being the Ath time domain resource that overlaps with $T_{PSFCH\_SL}+y_2$;

being the Ath time domain resource that overlaps with $T_{PSFCH\_Uu}+y_2$;

being the Ath time domain resource not earlier than $T_{PSFCH\_SL}+y_2$; and being the Ath time domain resource not earlier than $T_{PSFCH\_Uu}+y_2$, where A is an integer greater than or equal to 1.

In this embodiment of the present invention, a terminal and a control node determine the time domain resource of the target uplink channel based on the time interval $y_2$ and the first time domain location of the PSFCH, or the terminal and the control node determine the time domain resource of the target uplink channel based on the time interval $y_2$ and the second time domain location of the PSFCH, and determine the condition met by the time domain resource of the target uplink channel, so that the terminal and the control node can have a consistent understanding of the time domain resource of the target uplink channel, thereby ensuring that the control node properly allocates a resource of the target uplink channel, and improving accuracy of determining a resource of the target uplink channel by the terminal.

It should be noted that the communications device provided in this embodiment of the present invention is a communications device capable of performing the foregoing resource determining method, and all embodiments of the foregoing resource determining method are applicable to the communications device, with the same or similar beneficial effects achieved.

Alternatively, the radio frequency unit 501 is configured to obtain at least one of sidelink timing, Uu timing, and a timing offset, where the timing offset is a time offset between the sidelink timing and the Uu timing; and the processor 510 is configured to determine a configured sidelink grant resource and/or a hybrid automatic repeat request HARQ process of the configured sidelink grant resource based on at least one of the sidelink timing, the Uu timing, and the timing offset.

In this embodiment of the present invention, a terminal and a control node determine the configured sidelink grant resource and/or the hybrid automatic repeat request HARQ process of the configured sidelink grant resource based on at least one of the sidelink timing, the Uu timing, and the timing offset, so that the terminal and the control node can achieve a consistent understanding of the configured sidelink grant resource, thereby ensuring that the control node properly allocates the configured sidelink grant resource, and improving accuracy of determining the configured sidelink grant resource by the terminal.

It should be noted that the communications device provided in this embodiment of the present invention is a communications device capable of performing the foregoing resource determining method, and all embodiments of the foregoing resource determining method are applicable to the communications device, with the same or similar beneficial effects achieved.

It should be understood that in this embodiment of the present invention, the radio frequency unit 501 may be configured to receive and transmit signals in an information reception or transmission or call process. Specifically, after receiving downlink data from a base station, the radio frequency unit 501 transmits the downlink data to the processor 510 for processing, and in addition, transmits uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may further communicate with a network and another device by using a wireless communications system.

The terminal provides wireless broadband Internet access for a user by using the network module 502, for example, helps the user transmit and receive e-mails, browse web pages, and access streaming media.

The audio output unit 503 may convert audio data received by the radio frequency unit 501 or the network module 502 or stored in the memory 509 into an audio signal and output the audio signal as a sound. In addition, the audio output unit 503 may further provide audio output (for example, a call signal reception sound or a message reception sound) associated with a specific function performed by the terminal 500. The audio output unit 503 includes a speaker, a buzzer, a receiver, and the like.

The input unit 504 is configured to receive an audio or video signal. The input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. A processed image frame may be displayed on the display unit 506. The image frame processed by the graphics processing unit 5041 may be stored in the memory 509 (or another storage medium) or transmitted by the radio frequency unit 501 or the network module 502. The microphone 5042 may receive sounds and process such sounds into audio data. The processed audio data may be converted in a telephone call mode into a format that can be transmitted by the radio frequency unit 501 to a mobile communications base station, for outputting.

The terminal 500 further includes at least one sensor 505, for example, an optical sensor, a motion sensor, and another sensor. Specifically, the optical sensor includes an ambient light sensor and a proximity sensor. The ambient light sensor may adjust brightness of a display panel 5061 based on intensity of ambient light. When the terminal 500 moves to an ear, the proximity sensor may turn off the display panel 5061 and/or backlight. As a motion sensor, an accelerometer sensor may detect magnitudes of accelerations in all directions (usually three axes), may detect a magnitude and a direction of gravity when the terminal is still, and may be applied to posture recognition (for example, landscape/portrait mode switching, a related game, or magnetometer posture calibration) of the terminal, a function associated with vibration recognition (for example, a pedometer or a keystroke), or the like. The sensor 505 may further include a fingerprint sensor, a pressure sensor, an iris sensor, a molecular sensor, a gyroscope, a barometer, a hygrometer, a thermometer, an infrared sensor, or the like. Details are not described herein.

The display unit 506 is configured to display information entered by the user or information provided for the user. The display unit 506 may include the display panel 5061, and the display panel 5061 may be configured in a form of a liquid crystal display (LCD), an organic light-emitting diode (OLED), or the like.

The user input unit 507 may be configured to receive input digit or character information and generate key signal input associated with user setting and function control of the terminal. Specifically, the user input unit 507 includes a touch panel 5071 and other input devices 5072. The touch panel 5071 is also referred to as a touchscreen, and may collect a touch operation of the user on or near the touch panel (for example, an operation performed on or near the touch panel 5071 by the user by using any appropriate object or accessory such as a finger or a stylus). The touch panel 5071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 510, receives a command transmitted by the processor 510, and executes the command. In addition, the touch panel 5071 may be implemented in a plurality of types, for example, a resistive type, a capacitive type, an infrared type, and a surface acoustic wave type. In addition to the touch panel 5071, the user input unit 507 may further include the other input devices 5072. Specifically, the other input devices 5072 may include but are not limited to a physical keyboard, a function key (such as a volume control key or an on/off key), a trackball, a mouse, and a joystick. Details are not described herein.

Further, the touch panel 5071 may cover the display panel 5061. After detecting a touch operation on or near the touch panel 5071, the touch panel 5071 transmits the touch operation to the processor 510 to determine a type of a touch event. Then the processor 510 provides corresponding visual output on the display panel 5061 based on the type of the touch event. In FIG. 11, the touch panel 5071 and the display panel 5061 serve as two separate components to implement input and output functions of the terminal. However, in some embodiments, the touch panel 5071 and the display panel 5061 may be integrated to implement the input and output functions of the terminal. This is not specifically limited herein.

The interface unit 508 is an interface for connecting an external apparatus to the terminal 500. For example, the external apparatus may include a wired or wireless headset port, an external power (or battery charger) port, a wired or wireless data port, a memory card port, a port for connecting an apparatus having an identification module, an audio input/output (I/O) port, a video I/O port, an earphone port, and the like. The interface unit 508 may be configured to receive input (for example, data information and electric power) from the external apparatus, and transmit the received input to one or more elements in the terminal 500; or may be configured to transmit data between the terminal 500 and the external apparatus.

The memory 509 may be configured to store software programs and various data. The memory 509 may mainly include a program storage region and a data storage region. The program storage region may store an operating system, an application program required by at least one function (for example, an audio play function or an image play function), and the like. The data storage region may store data (for example, audio data or contacts) created based on usage of the mobile phone. In addition, the memory 509 may include a high-speed random access memory, or may include a nonvolatile memory, for example, at least one magnetic disk storage device or a flash memory device, or another volatile solid-state storage device.

The processor 510 is a control center of the terminal, connects various parts of the entire terminal by using various interfaces and lines, and performs various functions and data processing of the terminal by running or executing a software program and/or a module stored in the memory 509 and invoking data stored in the memory 509, to perform overall monitoring on the terminal. The processor 510 may include one or more processing units. Preferably, the processor 510 may integrate an application processor and a modem processor. The application processor mainly processes the operating system, a user interface, an application program, and the like. The modem processor mainly processes wireless communication. It can be understood that the modem processor may be alternatively not integrated in the processor 510.

The terminal 500 may further include a power supply 511 (for example, a battery) that supplies power to each component. Preferably, the power supply 511 may be logically connected to the processor 510 by using a power management system, so as to implement functions such as charging management, discharging management, and power consumption management by using the power management system.

In addition, the terminal 500 includes some functional modules that are not shown. Details are not described herein.

Figure 12:
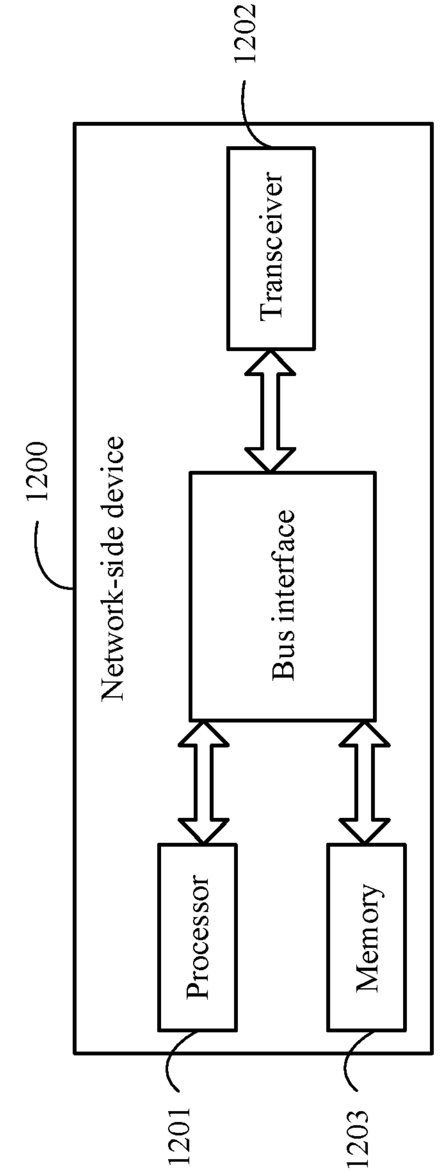
FIG. 12 is a schematic structural diagram of a network-side device according to an embodiment of the present invention.

In a case that the resource determining method provided in the embodiments of the present invention is applied to a control node and the control node is a network-side device, FIG. 12 is a structural diagram of a network-side device according to an embodiment of the present invention. The network-side device is capable of implementing details of the foregoing resource determining method, with the same effects achieved. As shown in FIG. 12, the network-side device 1200 includes a processor 1201, a transceiver 1202, a memory 1203, and a bus interface.

The processor 1201 is configured to read a program in the memory 1203 and perform the following process:

determining a time domain resource of a target uplink channel based on a time interval $y_2$ and a first time domain location $T_{PSFCH\_SL}$ of a physical sidelink feedback channel PSFCH, or based on the time interval $y_2$ and a second time domain location $T_{PSFCH\_Uu}$ of the PSFCH, where the time interval $y_2$ is a time interval between the PSFCH and the target uplink channel, and the time domain resource of the target uplink channel meets any one of the following conditions:

being the $A^{th}$ time domain resource within a time range of $T_{PSFCH\_SL}+y_2$;

being the $A^{th}$ time domain resource within a time range of $T_{PSFCH\_Uu}+y_2$;

being the $A^{th}$ time domain resource that overlaps with $T_{PSFCH\_SL}+y_2$;

being the $A^{th}$ time domain resource that overlaps with $T_{PSFCH\_Uu}+y_2$;

being the $A^{th}$ time domain resource not earlier than $T_{PSFCH\_SL}+y_2$; and being the $A^{th}$ time domain resource not earlier than $T_{PSFCH\_Uu}+y_2$, where A is an integer greater than or equal to 1.

In this embodiment of the present invention, a terminal and a control node determine the time domain resource of the target uplink channel based on the time interval $y_2$ and the first time domain location of the PSFCH, or the terminal and the control node determine the time domain resource of the target uplink channel based on the time interval $y_2$ and the second time domain location of the PSFCH, and determine the condition met by the time domain resource of the target uplink channel, so that the terminal and the control node can have a consistent understanding of the time domain resource of the target uplink channel, thereby ensuring that the control node properly allocates a resource of the target uplink channel, and improving accuracy of determining a resource of the target uplink channel by the terminal.

It should be noted that the communications device provided in this embodiment of the present invention is a communications device capable of performing the foregoing resource determining method, and all embodiments of the foregoing resource determining method are applicable to the communications device, with the same or similar beneficial effects achieved.

Alternatively, the processor 1201 is configured to read a program in the memory 1203 and perform the following process:

obtaining at least one of sidelink timing, Uu timing, and a timing offset, where the timing offset is a time offset between the sidelink timing and the Uu timing; and determining a configured sidelink grant resource and/or a hybrid automatic repeat request HARQ process of the configured sidelink grant resource based on at least one of the sidelink timing, the Uu timing, and the timing offset.

In this embodiment of the present invention, a terminal and a control node determine the configured sidelink grant resource and/or the hybrid automatic repeat request HARQ process of the configured sidelink grant resource based on at least one of the sidelink timing, the Uu timing, and the timing offset, so that the terminal and the control node can achieve a consistent understanding of the configured sidelink grant resource, thereby ensuring that the control node properly allocates the configured sidelink grant resource, and improving accuracy of determining the configured sidelink grant resource by the terminal.

It should be noted that the communications device provided in this embodiment of the present invention is a communications device capable of performing the foregoing resource determining method, and all embodiments of the foregoing resource determining method are applicable to the communications device, with the same or similar beneficial effects achieved.

In FIG. 12, a bus architecture may include any quantity of interconnected buses and bridges, and specifically connect together various circuits of one or more processors represented by the processor 1201 and a memory represented by the memory 1203. The bus architecture may further interconnect various other circuits such as a peripheral device, a voltage regulator, and a power management circuit. These are all well known in the art, and therefore are not further described in this specification. The bus interface provides an interface. The transceiver 1202 may be a plurality of components, including a transmitter and a receiver, and provides units for communicating with a variety of other apparatuses on a transmission medium.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may be alternatively implemented by using hardware. However, in most cases, the former is a preferred implementation. Based on such an understanding, the technical solutions of the present invention essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings, but the present invention is not limited to the foregoing implementations. The foregoing embodiments are only illustrative rather than restrictive. Inspired by the present invention, a person of ordinary skill in the art can still derive many variations without departing from the essence of the present invention and the protection scope of the claims. All these variations shall fall within the protection of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource determining method, comprising:

determining, by a terminal, a time domain resource of a target uplink channel based on a time interval $y_2$ and a time domain location $T_{PSFCH\_Uu}$ of a physical sidelink feedback channel (PSFCH), wherein the time interval $y_2$ is a time interval between the PSFCH and the target uplink channel, and transmitting, by the terminal to a control node, sidelink hybrid automatic repeat request acknowledgement (HARQ-ACK) information on the target uplink channel, wherein the sidelink HARQ-ACK information is obtained from the PSFCH;

wherein the time domain resource of the target uplink channel meets any one of the following conditions:

being the $A^{th}$ time domain resource within a time range of $T_{PSFCH\_Uu}+y_2$;

being the $A^{th}$ time domain resource that overlaps with $T_{PSFCH\_Uu}+y_2$; and being the $A^{th}$ time domain resource not earlier than $T_{PSFCH\_Uu}+y_2$, wherein A is an integer greater than or equal to 1, the time domain location $T_{PSFCH\_Uu}$ of the PSFCH is a time domain location of the PSFCH that is determined based on Uu timing, and there is a timing misalignment between a sidelink timing for the terminal to perform sidelink transmission and the Uu timing for performing transmission between the terminal and the control node;

wherein the sidelink timing is not aligned with the Uu timing, and the determining, by a terminal, a time domain resource of a target uplink channel based on a time interval $y_2$ and a time domain location $T_{PSFCH\_Uu}$ of a physical sidelink feedback channel (PSFCH) comprises:

determining the time domain resource of the target uplink channel based on the time interval $y_2$ and the time domain location $T_{PSFCH\_Uu}$ of PSFCH by using the Uu timing as a timing reference.

2. The method according to claim 1, wherein $y_2$ is determined based on a sidelink subcarrier spacing, or $y_2$ is determined based on an uplink subcarrier spacing.

3. The method according to claim 1, wherein the $A^{th}$ time domain resource comprises the $A^{th}$ sidelink time domain resource or the $A^{th}$ Uu time domain resource.

4. A resource determining method, comprising:

determining, by a control node, a time domain resource of a target uplink channel based on a time interval $y_2$ and a time domain location $T_{PSFCH\_Uu}$ of a physical sidelink feedback channel (PSFCH), wherein the time interval $y_2$ is a time interval between the PSFCH and the target uplink channel, and receiving, by the control node from a terminal, sidelink hybrid automatic repeat request acknowledgement (HARQ-ACK) information on the target uplink channel, wherein the sidelink HARQ-ACK information is obtained by the terminal from the PSFCH;

wherein the time domain resource of the target uplink channel meets any one of the following conditions:

being the $A^{th}$ time domain resource within a time range of $T_{PSFCH\_Uu}+y_2$;

being the $A^{th}$ time domain resource that overlaps with $T_{PSFCH\_Uu}+y_2$; and being the $A^{th}$ time domain resource not earlier than $T_{PSFCH\_Uu}+y_2$, wherein A is an integer greater than or equal to 1, the time domain location $T_{PSFCH\_Uu}$ of the PSFCH is a time domain location of the PSFCH that is determined based on Uu timing, and there is a timing misalignment between a sidelink timing for the terminal to perform sidelink transmission and the Uu timing for performing transmission between the terminal and the control node;

wherein the sidelink timing is not aligned with the Uu timing, and the determining, by a control node, a time domain resource of a target uplink channel based on a time interval $y_2$ and a time domain location $T_{PSFCH\_Uu}$ of a physical sidelink feedback channel (PSFCH) comprises:

determining the time domain resource of the target uplink channel based on the time interval $y_2$ and the time domain location $T_{PSFCH\_Uu}$ of PSFCH by using the Uu timing as a timing reference.

5. The method according to claim 4, wherein $y_2$ is determined based on a sidelink subcarrier spacing, or $y_2$ is determined based on an uplink subcarrier spacing.

6. The method according to claim 4, wherein the $A^{th}$ time domain resource comprises the $A^{th}$ sidelink time domain resource or the $A^{th}$ Uu time domain resource.

7. A terminal, comprising a processor, a memory, and a computer program stored in the memory and capable of running on the processor, wherein when the computer program is executed by the processor, the following steps are implemented:

determining a time domain resource of a target uplink channel based on a time interval $y_2$ and a time domain location $T_{PSFCH\_Uu}$ of a physical sidelink feedback channel (PSFCH), wherein the time interval $y_2$ is a time interval between the PSFCH and the target uplink channel, and transmitting, to a control node, sidelink hybrid automatic repeat request acknowledgement (HARQ-ACK) information on the target uplink channel, wherein the sidelink HARQ-ACK information is obtained from the PSFCH;

wherein the time domain resource of the target uplink channel meets any one of the following conditions:

being the $A^{th}$ time domain resource within a time range of $T_{PSFCH\_Uu}+y_2$;

being the $A^{th}$ time domain resource that overlaps with $T_{PSFCH\_Uu}+y_2$; and being the $A^{th}$ time domain resource not earlier than $T_{PSFCH\_Uu}+y_2$, wherein A is an integer greater than or equal to 1, the time domain location $T_{PSFCH\_Uu}$ of the PSFCH is a time domain location of the PSFCH that is determined based on Uu timing, and there is a timing misalignment between a sidelink timing for the terminal to perform sidelink transmission and the Uu timing for performing transmission between the terminal and the control node;

wherein the sidelink timing is not aligned with the Uu timing, and the determining a time domain resource of a target uplink channel based on a time interval $y_2$ and a time domain location $T_{PSFCH\_Uu}$ of a physical sidelink feedback channel (PSFCH) comprises:

determining the time domain resource of the target uplink channel based on the time interval $y_2$ and the time domain location $T_{PSFCH\_Uu}$ of PSFCH by using the Uu timing as a timing reference.

8. The terminal according to claim 7, wherein the $A^{th}$ time domain resource comprises the $A^{th}$ sidelink time domain resource or the $A^{th}$ Uu time domain resource.

9. The terminal according to claim 7, wherein $y_2$ is determined based on a sidelink subcarrier spacing, or $y_2$ is determined based on an uplink subcarrier spacing.

10. A control node, comprising a processor, a memory, and a computer program stored in the memory and capable of running on the processor, wherein when the computer program is executed by the processor, the following steps are implemented:

determining a time domain resource of a target uplink channel based on a time interval $y_2$ and a time domain location $T_{PSFCH\_Uu}$ of a physical sidelink feedback channel (PSFCH), wherein the time interval $y_2$ is a time interval between the PSFCH and the target uplink channel, and receiving, from a terminal, sidelink hybrid automatic repeat request acknowledgement (HARQ-ACK) information on the target uplink channel, wherein the sidelink HARQ-ACK information is obtained by the terminal from the PSFCH;

wherein the time domain resource of the target uplink channel meets any one of the following conditions:

being the $A^{th}$ time domain resource within a time range of $T_{PSFCH\_Uu}+y_2$;

being the $A^{th}$ time domain resource that overlaps with $T_{PSFCH\_Uu}+y_2$; and being the $A^{th}$ time domain resource not earlier than $T_{PSFCH\_Uu}+y_2$, wherein A is an integer greater than or equal to 1, the time domain location $T_{PSFCH\_Uu}$ of the PSFCH is a time domain location of the PSFCH that is determined based on Uu timing, and there is a timing misalignment between a sidelink timing for the terminal to perform sidelink transmission and the Uu timing for performing transmission between the terminal and the control node;

wherein the sidelink timing is not aligned with the Uu timing, and the determining a time domain resource of a target uplink channel based on a time interval $y_2$ and a time domain location $T_{PSFCH\_Uu}$ of a physical sidelink feedback channel (PSFCH) comprises:

determining the time domain resource of the target uplink channel based on the time interval $y_2$ and the time domain location $T_{PSFCH\_Uu}$ of PSFCH by using the Uu timing as a timing reference.

11. The control node according to claim 10, wherein $y_2$ is determined based on a sidelink subcarrier spacing, or $y_2$ is determined based on an uplink subcarrier spacing.

12. The control node according to claim 10, wherein the $A^{th}$ time domain resource comprises the $A^{th}$ sidelink time domain resource or the $A^{th}$ Uu time domain resource.

13. A non-transitory computer-readable storage medium, wherein the computer-readable storage medium stores a computer program, and when the computer program is executed by a processor, the steps of the resource determining method according to claim 1 are implemented.

14. The storage medium according to claim 13, wherein the $A^{th}$ time domain resource comprises the $A^{th}$ sidelink time domain resource or the $A^{th}$ Uu time domain resource.

15. The storage medium according to claim 13, wherein $y_2$ is determined based on a sidelink subcarrier spacing, or $y_2$ is determined based on an uplink subcarrier spacing.

16. A non-transitory computer-readable storage medium, wherein the computer-readable storage medium stores a computer program, and when the computer program is executed by a processor, the steps of the resource determining method according to claim 4 are implemented.

17. The storage medium according to claim 16, wherein the $A^{th}$ time domain resource comprises the $A^{th}$ sidelink time domain resource or the $A^{th}$ Uu time domain resource.

18. The storage medium according to claim 16, wherein $y_2$ is determined based on a sidelink subcarrier spacing, or $y_2$ is determined based on an uplink subcarrier spacing.

* * * * *